United States Patent
Reddy et al.

(10) Patent No.: US 12,131,151 B2
(45) Date of Patent: *Oct. 29, 2024

(54) SYSTEM AND METHOD FOR PREDICTING THE IMPACT OF SOURCE CODE MODIFICATION BASED ON HISTORICAL SOURCE CODE MODIFICATIONS

(71) Applicant: CERNER INNOVATION, INC., North Kansas City, MO (US)

(72) Inventors: Jaipal Reddy, Bangalore (IN); Pratik Nath, Bangalore (IN); Srinidhi Kumble, Bengaluru (IN); Venkata Rama Raju Nadimpalli, Bangalor (IN); Amarrtya Jana, Kolkata (IN); Darshan Matada Shashidhara, Bangalore (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,566

(22) Filed: Jun. 24, 2022

(65) Prior Publication Data
US 2022/0318004 A1 Oct. 6, 2022

Related U.S. Application Data

(63) Continuation of application No. 17/101,284, filed on Nov. 23, 2020, now Pat. No. 11,422,795.

(51) Int. Cl.
G06F 8/71 (2018.01)
G06F 8/75 (2018.01)
G06N 20/00 (2019.01)

(52) U.S. Cl.
CPC ................ *G06F 8/71* (2013.01); *G06F 8/75* (2013.01); *G06N 20/00* (2019.01)

(58) Field of Classification Search
CPC .............. G06F 8/71; G06F 8/75; G06N 20/00
See application file for complete search history.

(56) References Cited

U.S. PATENT DOCUMENTS

| | | | |
|---|---|---|---|
| 5,936,634 A | 8/1999 | Kawamoto et al. | |
| 7,490,319 B2 * | 2/2009 | Blackwell | G06F 11/3664 717/124 |

(Continued)

OTHER PUBLICATIONS

Taweesup Apiwattanapong et al., "Efficient and Precise Dynamic Impact Analysis Using Execute-After Sequences", May 2005 (Year: 2005).*

(Continued)

*Primary Examiner* — Douglas M Slachta
(74) *Attorney, Agent, or Firm* — Invoke

(57) ABSTRACT

Methods, systems, and computer-readable media are disclosed herein that utilizes historical changes made to files and methods in computer programming code to predict related files and methods that may be affected by current and/or future changes made to other files and methods. In aspects, when computer code for a particular method is going to be edited, other methods are identified that were changed in previous editing sessions that also included changes to the particular method. Using scoring techniques for the other methods, a recommendation is provided that details the relative strength of whether the other methods are predicted to be affected by any changes made to the computer code for the particular method that is edited.

25 Claims, 23 Drawing Sheets

(56) References Cited

U.S. PATENT DOCUMENTS

| | | | |
|---|---|---|---|
| 8,225,302 B2* | 7/2012 | Waugh | G06F 8/77 |
| | | | 717/122 |
| 8,898,676 B2 | 11/2014 | Hiltgen et al. | |
| 9,049,105 B1* | 6/2015 | Feinstein | H04L 41/069 |
| 9,122,490 B2 | 9/2015 | Fanning et al. | |
| 9,442,830 B1* | 9/2016 | Zhang | G06F 11/3676 |
| 9,542,176 B2* | 1/2017 | Bird | G06F 8/71 |
| 10,275,240 B2* | 4/2019 | Kogan | G06F 8/433 |
| 10,482,005 B1* | 11/2019 | Benny | G06F 11/3688 |
| 10,552,140 B2* | 2/2020 | Mukherjee | G06F 8/65 |
| 10,754,643 B2* | 8/2020 | Arquero | G06F 11/3457 |
| 10,817,283 B1 | 10/2020 | Naik | |
| 11,106,460 B2* | 8/2021 | Culibrk | G06F 8/71 |
| 11,281,460 B1 | 3/2022 | Reddy et al. | |
| 2009/0083268 A1* | 3/2009 | Coqueret | G06F 16/219 |
| 2009/0265713 A1* | 10/2009 | Nedblake | G16Z 99/00 |
| | | | 718/105 |
| 2010/0299305 A1 | 11/2010 | Laxman et al. | |
| 2012/0036497 A1 | 2/2012 | Karthik et al. | |
| 2012/0311523 A1* | 12/2012 | Venkataraman | G06F 16/282 |
| | | | 717/104 |
| 2013/0080993 A1 | 3/2013 | Stravers et al. | |
| 2013/0227542 A1 | 8/2013 | Pei et al. | |
| 2014/0229919 A1* | 8/2014 | Spiridonov | G06F 11/34 |
| | | | 717/125 |
| 2014/0310559 A1 | 10/2014 | Deng et al. | |
| 2014/0331203 A1 | 11/2014 | Elshishiny et al. | |
| 2014/0337672 A1* | 11/2014 | Hanzaike | F16D 13/68 |
| | | | 714/38.1 |
| 2015/0212993 A1* | 7/2015 | Farchi | G06F 40/197 |
| | | | 715/256 |
| 2016/0188325 A1* | 6/2016 | Blitzstein | H04L 65/403 |
| | | | 717/101 |
| 2017/0068676 A1 | 3/2017 | Jayachandran et al. | |
| 2019/0213355 A1* | 7/2019 | Raviv | H04L 51/04 |
| 2019/0303564 A1* | 10/2019 | Kelly | G06F 21/577 |
| 2019/0324989 A1* | 10/2019 | Borochoff | G06F 16/282 |
| 2020/0034135 A1 | 1/2020 | Shi et al. | |
| 2020/0034222 A1* | 1/2020 | Bendiganavale | G06F 11/079 |
| 2020/0174907 A1 | 6/2020 | Lundquist et al. | |
| 2020/0349055 A1 | 11/2020 | Reddy et al. | |
| 2021/0049050 A1 | 2/2021 | Goodwin et al. | |
| 2021/0049465 A1 | 2/2021 | Bogdan et al. | |
| 2021/0247976 A1 | 8/2021 | Masis et al. | |
| 2022/0156053 A1* | 5/2022 | Shaastry | G06F 8/75 |
| 2022/0164181 A1 | 5/2022 | Reddy et al. | |
| 2022/0164184 A1 | 5/2022 | Reddy et al. | |

OTHER PUBLICATIONS

Notice of Allowance received for U.S. Appl. No. 17/101,287, dated Aug. 23, 2021, 10 pages.

* cited by examiner

You are trying to modify high defect density method, please make sure existing CRs are not impacted. Following are the impacted CRs.

Success! 36 results

PERFORMANCE: 0 results  STABILITY: 0 results

CHIA: 0 results  PF: 0 results

| CR NUMBER | TYPE | SOLUTION CD | STATUS | CHIA | PF | CLASSIFICATION |
|---|---|---|---|---|---|---|
| BBT-212 | Defect | Blood Bank Transfusion | ○ Closed | | No | |
| BBT-253 | Defect | Blood Bank Transfusion | ○ Closed | | No | |
| BBT-128 | Defect | Blood Bank Transfusion | ○ Closed | | No | |
| BBT-143 | Defect | Blood Bank Transfusion | ○ Closed | | | |
| BBT-983 | Enhancement | Blood Bank Transfusion | ○ Closed | | No | |
| 1-319167130 | Defect | Blood Bank Transfusion | ○ Closed | | No | |
| 1-319074779 | Defect | Blood Bank Transfusion | ○ Closed | | No | |
| 1-319136950 | Defect | Blood Bank Transfusion | ○ Closed | | No | |
| 1-319145482 | Defect | Blood Bank Transfusion | ○ Closed | | No | |
| 1-319244816 | Defect | Blood Bank Transfusion | ○ Closed | | No | |

Previous    Page [1] of 4    [10 rows ▼]    Next

DETAILED CRS

*FIG. 12.*

SYSTEM AND METHOD FOR PREDICTING THE IMPACT OF SOURCE CODE MODIFICATION BASED ON HISTORICAL SOURCE CODE MODIFICATIONS

CROSS REFERENCE TO RELATED APPLICATIONS

This patent application is a continuation of non-provisional U.S. application Ser. No. 17/101,284, filed on Nov. 23, 2020 and entitled "SYSTEM AND METHOD FOR PREDICTING THE IMPACT OF SOURCE CODE MODIFICATION BASED ON HISTORICAL SOURCE CODE MODIFICATIONS," which is related by subject matter to non-provisional U.S. application Ser. No. 17/101,287, filed on Nov. 23, 2020 and entitled "SYSTEM AND METHOD FOR IDENTIFYING SOURCE CODE DEFECT INTRODUCTION DURING SOURCE CODE MODIFICATION," which are incorporated herein by reference in their entireties.

BACKGROUND

When a computer software developer attempts to correct a defect and/or to enhance a software or platform functionality, the computer software developer utilizes available tools in an attempt to recognize and understand impacted computer code for the software or platform functionality. However, these attempts made by the computer software developer often create and introduce new errors and defects because the computer software developer lacks complete knowledge and/or visibility of a client's workflow that utilizes the software or platform functionality being modified, updated, or introduced. The available tools also do not provide complete knowledge and/or visibility in this regard. Additionally, these attempts made by the computer software developer can create and introduce further errors and defects because the computer software developer does not have access to tools that facilitates a holistic impact analysis for the client workflows that utilizes the software or platform functionality. Accordingly, the introduced defects and errors interrupt and degrade the client experience for the corresponding workflow that is being impacted by the software or platform functionality being modified, updated, or introduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media that provide complete and comprehensive knowledge of the complex upstream and downstream dependencies present for the entirety of a client workflow through true knowledge that is obtained by way of multi-pronged dependency graphing, and through intelligent predictions made from prior modifications to the computer code.

In one aspect, a computerized method for impact identification based on code analysis is provided. In some aspects, a static dependency graph is generated that maps a first plurality of dependencies for one or more client workflows encoded in a code base. An internal-domain dynamic dependency graph is also generated, by tracing a first plurality of method calls based on execution of the code base in an internal domain, in aspects. The internal-domain dynamic dependency graph includes, in an aspect, a second plurality of dependencies identified for the one or more client workflows based on the first plurality of method calls. In various aspects, overlap and at least one difference between the first plurality of dependencies and the second plurality of dependencies are identified by superimposing the internal-domain dynamic dependency graph and the static dependency graph. Additionally, a client-domain dynamic dependency graph is generated by tracing a second plurality of method calls based on execution of the code base in a client domain, in one aspect. The client-domain dynamic dependency graph includes, in such an aspect, a third plurality of dependencies identified for the one or more client workflows based on the second plurality of method calls. In some aspects, an impact analysis for the one or more client workflows is performed, based on a comparison of the first plurality of dependencies, the second plurality of dependencies, and the third plurality of dependencies.

In another aspect, one more non-transitory computer-readable media having computer-executable instructions embodied thereon are provided that, when executed using one or more hardware processors, perform a method for impact identification based on code analysis. In some aspects, a static dependency graph is generated that maps a first plurality of dependencies for one or more client workflows encoded in a code base. An internal-domain dynamic dependency graph is generated, in an aspect, by tracing a first plurality of method calls based on execution of the code base in an internal domain. The internal-domain dynamic dependency graph includes a second plurality of dependencies identified for the one or more client workflows based on the first plurality of method calls, in some aspects. In various aspects, overlap and at least one difference between the first plurality of dependencies and the second plurality of dependencies are identified by superimposing the internal-domain dynamic dependency graph and the static dependency graph. A client-domain dynamic dependency graph is generated, in one aspect, by tracing a second plurality of method calls based on execution of the code base in a client domain. The client-domain dynamic dependency graph includes a third plurality of dependencies identified for the one or more client workflows based on the second plurality of method calls, in one aspect. An impact analysis is performed for the one or more client workflows based on a comparison of the first plurality of dependencies, the second plurality of dependencies, and the third plurality of dependencies. In some aspects, the impact analysis identifies specific upstream and downstream method call dependencies for the one or more client workflows using each of the first, second, and third plurality of dependencies. The impact analysis may also, in various aspects, identify overlap and differences between the first, second, and third, dependencies.

A system for impact identification based on code analysis is provided in yet another aspect. In some aspects, the system comprises a dependency graph generating module that generates a static dependency graph that maps a first plurality of dependencies for one or more client workflows encoded in a code base. An internal-domain dynamic dependency graph is generated, in aspects, by the dependency graph generating module which traces a first plurality of method calls based on execution of the code base in an internal domain. In an aspect, the internal-domain dynamic dependency graph includes a second plurality of dependencies identified for the one or more client workflows based on the first plurality of method calls. A client-domain dynamic dependency graph is generated by the dependency graph generating module, which traces a second plurality of method calls based on execution of the code base in a client domain, in various aspects. The client-domain dynamic dependency graph includes a third plurality of dependencies identified for the one or more client workflows based on the second plurality of method calls. The system includes a superimposing module that identifies overlap and at least one difference between the first plurality of dependencies and the second plurality of dependencies by superimposing the internal-domain dynamic dependency graph and the static dependency graph, in an aspect. The impact analysis module of the system performs an impact analysis for the one or more client workflows based on a comparison of the first plurality of dependencies, the second plurality of dependencies, and the third plurality of dependencies, in various aspects. A graphical user interface module, in some aspects, generates and causes display of the impact analysis, wherein the impact analysis is specific to a first method that is selected from displayed computer code from the code base, and wherein the impact analysis specifies at least one of an upstream dependency relationship or a downstream dependency relationship of a second method relative to the first method.

In one aspect, one more non-transitory computer-readable media having computer-executable instructions embodied thereon are provided, that when executed perform a method to predict additional methods that may be affected by modification to another method based on historical modifications. In such aspects, a current request to modify a first method is received and a modification made to the first method in the current request is tracked. At least a second method is identified that is predicted to be affected by the modification made to the first method in the current request, in some aspects. A recommendation is provided, in one aspect, that identifies the second method and that indicates the second method is predicted to be affected by the modification made to the first method in the current request.

In another aspect, one more non-transitory computer-readable media having computer-executable instructions embodied thereon are provided, that when executed perform a method to predict additional methods that may be affected by modification to another method based on historical modifications. A current request to modify a first method is received and a modification made to the first method by the current request is tracked, in aspects. In some aspects, at least a second method is identified that was modified by at least one of the one or more prior requests that include a prior modification made to the first method. A score for the second method is determined, in as aspect, and based on the score, it can be identified that the second method is predicted to be affected by the modification made to the first method by the current request. In various aspects, a recommendation is provided that identifies at least the second method and that indicates the second method is predicted to be affected by the modification made to the first method by the current request.

In yet another aspect, a system is provided for predicting additional methods that may be affected by modification to another method based on historical modifications. The system includes, in some aspects, a tracking feature module that receives a current request to modify a first method and tracks a modification made to the first method by the current request. In aspects, the system includes a recommendation engine module that identifies at least a second method that was modified by at least one of the one or more prior requests that include a prior modification made to the first method. The recommendation engine module determines a score of the second method, in an aspect. Based on the score, the recommendation engine module identifies that the second method is predicted to be affected by the modification made to the first method by the current request. In some aspects, the recommendation engine module provides a recommendation that identifies at least the second method and that indicates the second method is predicted to be affected by the modification made to the first method by the current request. A graphical user interface module that causes the recommendation to be displayed in a graphical user interface is also included in the system.

BRIEF DESCRIPTION OF THE DRAWINGS

Aspects are described in detail below with reference to the attached drawings, wherein:

FIG. 7 depicts a graphical user interface of selectable source code and a pop-up menu with an option for performing impact analysis, in accordance with aspects herein;

FIG. 9 depicts a graphical user interface of selectable source code and the pop-up menu with the option for performing impact analysis, in accordance with aspects herein;

FIG. 12 depicts a graphical user interface showing a defect density report, in accordance with aspects herein;

DETAILED DESCRIPTION

Figure 1:
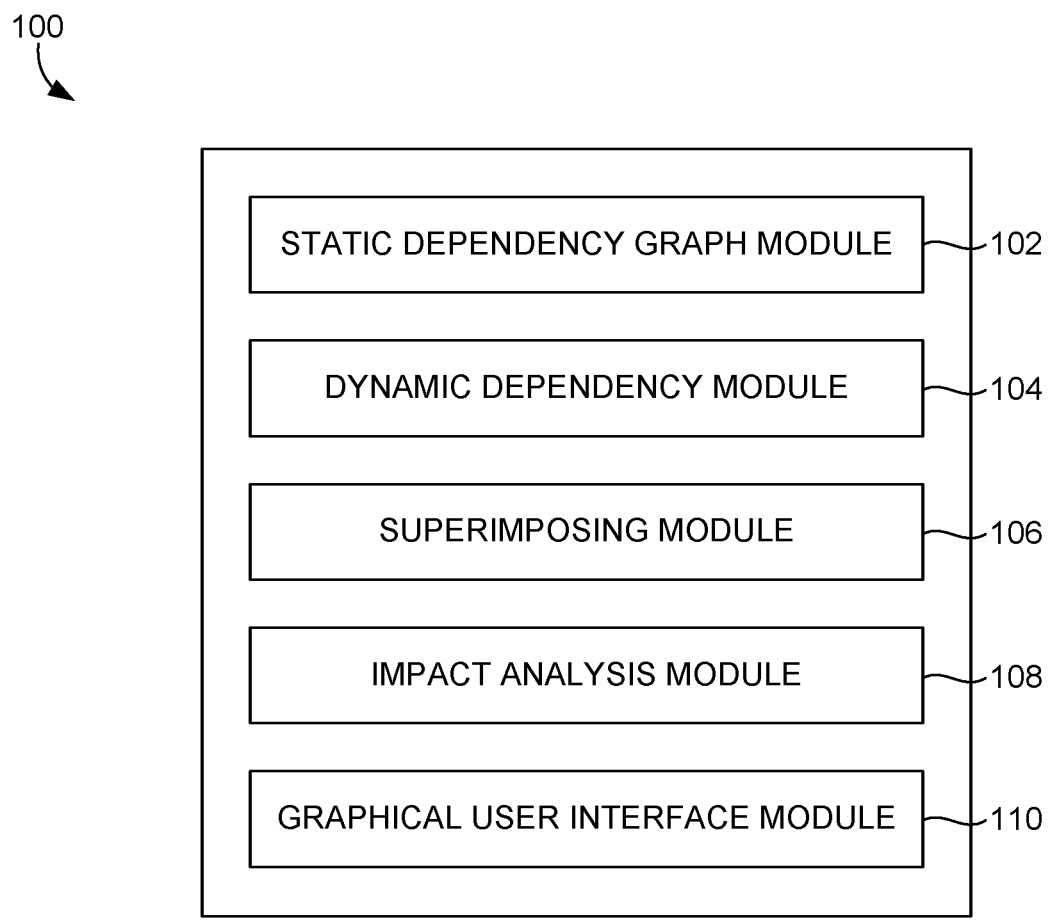
FIG. 1 is a block diagram of a system for impact identification based on code analysis, in accordance with aspects herein.

The subject matter of the present invention is described with specificity herein to meet statutory requirements. However, the Detailed Description itself is not intended to limit the scope of this patent. Rather, the inventors have contemplated that the claimed subject matter might also be embodied in other ways, to include different modules, components, software and hardware features, steps, and/or any combinations thereof, in conjunction with other present or future technologies. Moreover, although the terms "step" and/or "block" may be used herein to connote different elements of methods employed, and the terms should not be interpreted as implying any particular order among or between various steps herein disclosed unless and except when the order of individual steps is explicitly described.

Using the systems, methods, and media described hereinafter, a comprehensive impact analysis can be performed on a computer programming code base (e.g., source code) in order to identify one or more workflows encoded by the code base that are affected when modifications are made to various portions of the code that correspond to various methods. Specifically, complete and highly complex method-to-method upstream and downstream dependencies (i.e., which methods call other particular methods, and which methods are called by other particular methods) of the workflows can be traced and identified directly from the code itself, in an automated manner without any user interaction or manual user input. In this manner, the "impact" the code modification will incur for other methods having dependencies can be identified, summarized, and provided to a user.

Additionally, using the systems, methods, and media described hereinafter, predictions can be made based on an analysis of historical code modifications made to one or more workflows, without performing any dependency tracing. Specifically, aspects herein can predict, in an automated manner without user interaction or manual user input, whether one or more methods, component(s), and/or solution(s) may be affected when specific modifications are made to various portions of the computer programming code base (e.g., source code) for one or more workflows methods. The predictions are determined based on previously-made modifications to the code itself, without performing any dependency tracing. In aspects, when the code for a particular method is to be modified, aspects herein can predict which specific other methods may be affected by the code modifications based on prior code modifications. In this manner, the "impact" the code modification may incur for other methods can be identified, summarized, and provided to a user.

As used herein, a "dependency" can refer to any type of functional call between methods within a component, between one component and another component, and/or between two different solutions, for the workflows within the code base. For simplicity and brevity, "method calls" and "methods" are referred to herein, though it will be understood that functional calls between methods, component(s), and solution(s) are encompassed by and included in the aspects discussed herein. As such, aspects herein are not limited to calls for methods alone, as other functional calls are within the scope of this description. Additionally, the terms "method" and "file" are used interchangeably herein.

Impact Identification

Beginning with FIG. 1, a block diagram of a system 100 for impact identification is shown in accordance with aspects herein. The system 100 includes a static dependency graph module 102, a dynamic dependency graph module 104, a superimposing module 106, an impact analysis module 108, and a graphical user interface module 110, in various aspects. Although not shown in FIG. 1, the system 100 may include or may access a database that stores one or more code bases, the code bases being computer programming source code for methods, functional calls, components, and solutions of the one or more workflows.

In one aspect, the static dependency graph module 102 generates a static dependency graph that maps a first plurality of dependencies for one or more client workflows, as the workflows are encoded in a code base. The static dependency graph module 102 scans the code in a static manner, without execution of the code, in aspects.

The dynamic dependency graph module 104 may, in aspects, generate a client-domain dynamic dependency graph by tracing a second plurality of method calls based on execution of the code base in a client domain, wherein the client-domain dynamic dependency graph includes a third plurality of dependencies identified for the one or more client workflows based on the second plurality of method calls. Additionally, in some aspects, the dynamic dependency graph module 104 generates an internal-domain dynamic dependency graph by tracing a first plurality of method calls based on execution of the code base in an internal domain, wherein the internal-domain dynamic dependency graph includes a second plurality of dependencies identified for the one or more client workflows based on the first plurality of method calls. The dynamic dependency graph module 104 traces the dependencies that are revealed by running the workflow through the execution of the code, in aspects, whether using an internal domain and/or a client domain to provide a multi-pronged approach to tracing the depend.

In various aspects, the static dependency graph module 102 and the dynamic dependency graph module 104 may be a single integrated module, or may be separate and independent modules within the system 100.

The system 100 further includes the superimposing module 106. The superimposing module 106 may identify overlap and at least one difference between the first plurality of dependencies and the second plurality of dependencies. Specifically, the superimposing module 106 superimposes the internal-domain dynamic dependency graph and the static dependency graph, in aspects, in order to make a comparison of the dependencies found by static scanning of the code and the dependencies found by tracing the workflow when the code is executed in the internal domain. For example, the superimposing module 106 may identify, based on the superimposition of graphs, one or more particular functional calls, methods, components, solutions, and/or dependencies that are shared by both graphs, as well as one or more particular functional calls, methods, components, solutions, and/or dependencies that are different and are not shared by both graphs. The third dependencies found by tracing the workflow when the code is executed in the client domain may also be compared to the superimposed graphs, in aspects.

Accordingly, the impact analysis module 108 may perform an impact analysis for the one or more client workflows based on a comparison of the first plurality of dependencies, the second plurality of dependencies, and the third plurality of dependencies, in some aspects. The impact analysis may identify one or more specific method(s) that have an increased likelihood of being unintentionally affected by modifications made to the code portions that corresponds to other method(s), e.g., defect introduction. The impact analysis provides a comprehensive view of all or nearly all of the dependencies present in the workflows, which have been identified using the multi-pronged approach to mapping and tracing the dependencies in a static and dynamic manner, and using multiple domains (e.g., internal and external). Defect introduction may occur when a modification made to a first method's code affects another upstream or downstream methods in the workflows, wherein the software engineer, client's, or other user's knowledge of the dependency is lacking. The impact analysis creates comprehensive visibility and overcomes this technologically persistent problem.

In the system 100, the graphical user interface module 110 may generate and cause the display of the impact analysis. The impact analysis may, generally, be specific to a first method that is selected from displayed computer code from the code base, and wherein the impact analysis specifies at least one of an upstream dependency relationship or a downstream dependency relationship of a second method relative to the first method. Accordingly, for each selected portion of code for various methods, an impact analysis may be performed that is specific to the portion of code and the method encoded by the portion of code.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the arrangement and/or integrated placement of components illustrated in FIG. 1 are examples, and other methods, hardware, software, components, and devices for establishing direct, indirect, local, and/or remote communication links between the components may be utilized in implementations of the present invention. It will be understood to those of ordinary skill in the art that the components may be connected in various manners, hardwired or wireless, and may use intermediary components that have been omitted or not included in FIG. 1 for simplicity's sake. Further, it will be understood that the components of the system 100 may communicate with each other directly or, for example, indirectly via a network, including one or more of a telecommunication network, a local area network (LANs), a wide area network (WANs), and/or a peer-to-peer-network, though not shown. Such networking environments may include campus-wide or enterprise-wide computer networks, intranets, and the Internet.

Further, the absence of components from FIG. 1 should not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of any device(s) or component(s) depicted. It should be understood that any number of components shown in FIG. 1 may be employed within the system 100 within the scope of the present invention. Each may be implemented via a single device or multiple devices cooperating in a distributed environment.

Figure 2:
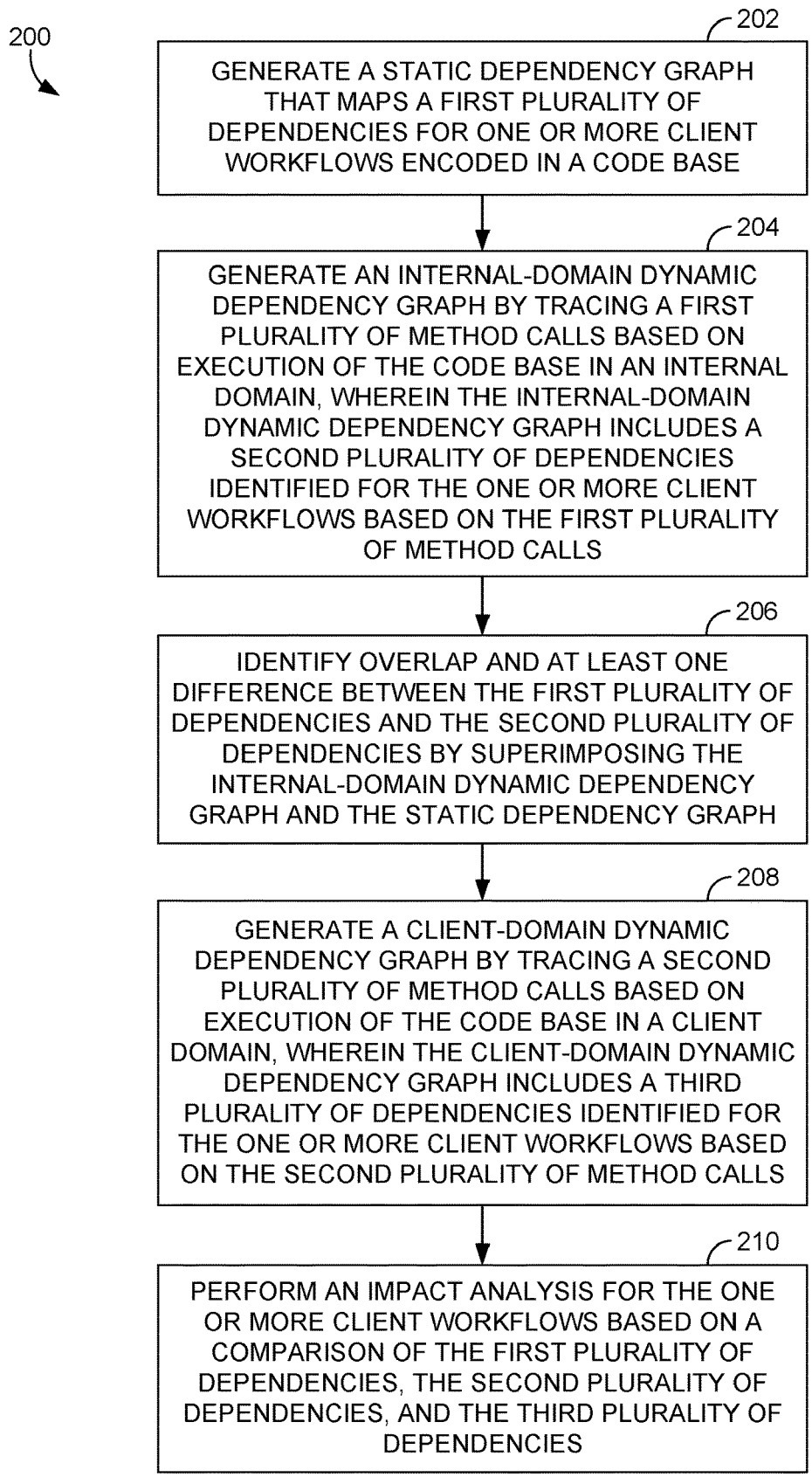
FIG. 2 is a flow diagram showing a method for impact identification based on code analysis, in accordance with aspects herein.
Figure 3:
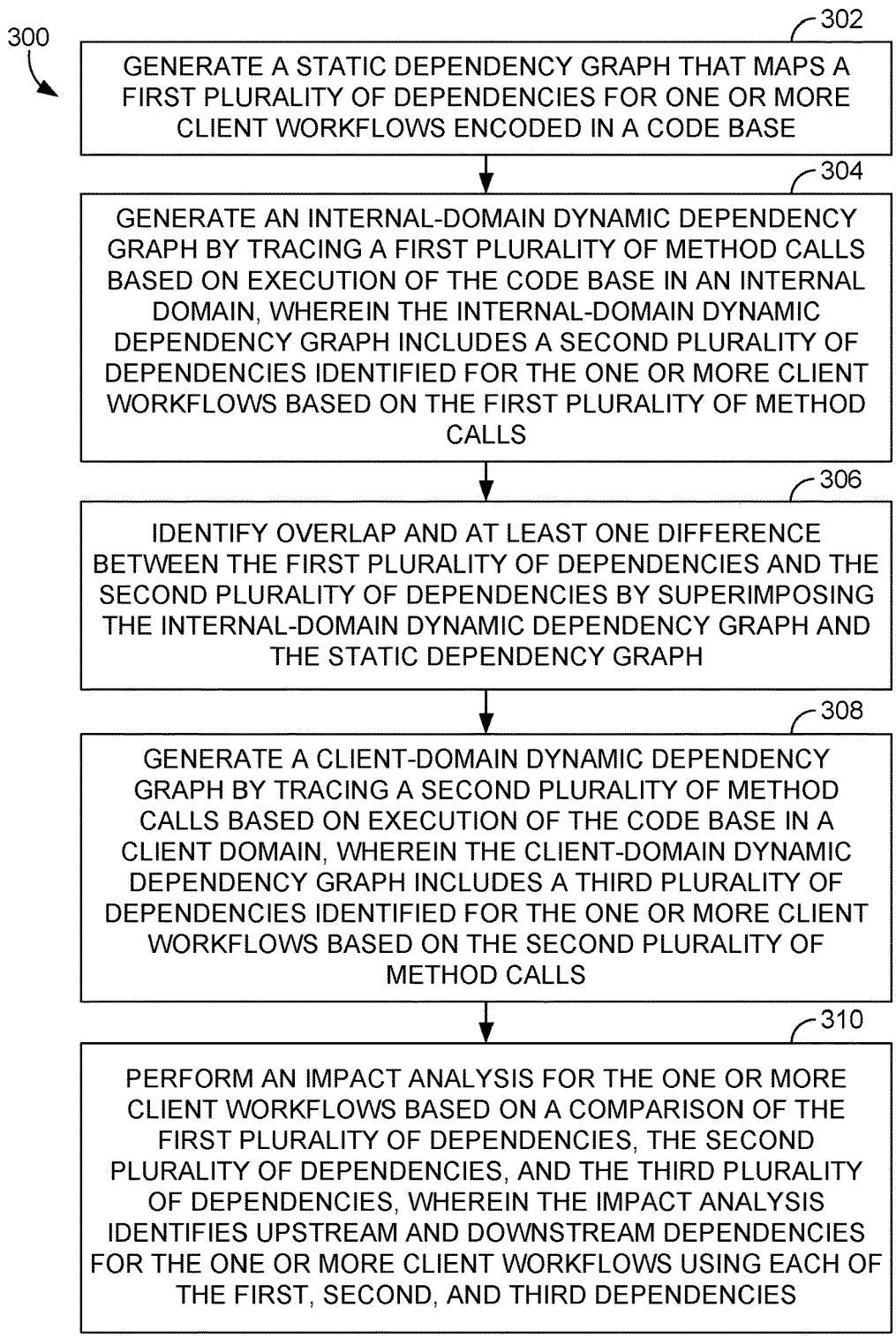
FIG. 3 is a flow diagram showing another method for impact identification based on code analysis, in accordance with aspects herein.

Turning to FIGS. 2 and 3, methods are discussed that can be performed via one or more of the components and component interactions previously described in FIG. 1. As such, the methods may be discussed with brevity, though it will be understood that the previous discussion and details described therein can be applicable to aspect of the methods of FIGS. 2 and 3. Additionally or alternatively, it will be understood that the methods discussed herein can be implemented or performed via the execution of computer-readable instructions stored on computer readable media, by way of one or more processors. In one aspect, one or more non-transitory computer-readable storage media having computer-readable instructions or computer-readable program code portions embodied thereon, for execution via one or more processors, can be used to implement and/or perform the methods. For example, computer-readable instructions or computer-readable program code portions can specify the performance of the methods, can specify a sequence of steps of the methods, and/or can identify particular component(s) of a software and/or hardware for performing one or more of the steps of the methods, in aspects. Therefore, in some aspects, the methods can be computer-implemented methods.

FIG. 2 presents a flow diagram showing a method 200 for impact identification based on code analysis, in accordance with aspects herein. In general, one or more code bases that encode one or more client workflows are received, retrieved, obtained, or otherwise accessed as input to the system 100 of FIG. 1, in various aspects. At block 202, a static dependency graph is generated that maps a first plurality of dependencies for one or more client workflows encoded in a code base. In some aspects, the static dependency graph module 102 of the system 100 of FIG. 1 generates the static dependency graph that maps the first plurality of dependencies. I In an aspect, generating the static dependency graph includes scanning computer code that encodes the one or more client workflows in the code base. In one such aspect, all of the first plurality of dependencies between method calls are identified based on scanning the computer code. The static dependency graph includes, in various aspects, a portion or all of the first plurality of dependencies, wherein the first plurality of dependencies represents upstream and downstream calls between methods of the one or more client workflows which are identifiable from a static scan of the code (i.e., no execution/running of the code). The first plurality of dependencies identified may include at least one upstream method that calls another downstream method in the one or more client workflows, and/or the first plurality of dependencies may include at least one downstream method that is called by another upstream method in the one or more client workflows. In various aspects, upstream and downstream dependencies are identified in the scale of hundreds to millions within the one or more client workflows encoded in the code base.

At block 204, an internal-domain dynamic dependency graph is generated by tracing a first plurality of method calls based on execution of the code base in an internal domain, wherein the internal-domain dynamic dependency graph includes a second plurality of dependencies identified for the one or more client workflows based on the first plurality of method calls. In some aspects, the dynamic dependency graph module 104 of the system 100 of FIG. 1 generates the internal-domain dynamic dependency graph. In aspects, generating the internal-domain dynamic dependency graph includes executing the one or more client workflows within an internal domain and tracing the first plurality of method calls that occur during the execution of the one or more client workflows. Further, generating the internal-domain dynamic dependency graph may include, in some aspects, identifying at least one of an upstream dependency relationship or a downstream dependency relationship for a portion of or all of the methods that are called from the first plurality of method calls during the code's execution. The internal-domain dynamic dependency graph can include a second plurality of dependencies identified by tracing the first plurality of method calls, and the second plurality of dependencies can include one or more of an upstream dependency relationship and/or a downstream dependency relationship for a portion of or all of the methods from the first plurality of method calls.

At block 206, overlap and at least one difference between the first plurality of dependencies and the second plurality of dependencies are identified by superimposing the internal-domain dynamic dependency graph and the static dependency graph.

Accordingly, similarities (e.g., overlap) and/or differences between the method dependencies identified from the static graph and the method dependencies identified from the dynamic call graph are identified. For example, one or more of the dependencies identified in the static graph may be missing or absent from the dynamic graph's dependencies, and one or more of the dependencies identified in the dynamic graph may be missing or absent from the static graph's dependencies. For example, at least one method that is present in the internal-domain dynamic dependency graph (e.g., having the second plurality of dependencies) may be identified as being missing or absent from the static dependency graph (e.g., having the first plurality of dependencies), and/or at least one method that is absent or missing in the internal-domain dynamic dependency graph is present from the static dependency graph. Additionally, based on the superimposition of the two graphs, a first set of dependencies that are common to both graphs and/or that are present in both graphs can be identified. In some aspects, the superimposing module 106 of the system 100 of FIG. 1 performs these functions to superimpose graphs and identify similarities and differences. Accordingly, the dependencies found by the static scan of the code base can be compared to the dependencies found by tracing during the execution of the code base in the internal domain, in order to identify similarities and differences in the dependencies that are identified by these two different techniques and the graphs generated.

At block 208, a client-domain dynamic dependency graph is generated by tracing a second plurality of method calls based on execution of the code base in a client domain, wherein the client-domain dynamic dependency graph includes a third plurality of dependencies identified for the one or more client workflows based on the second plurality of method calls. In some aspects, the dynamic dependency graph module 104 of the system 100 of FIG. 1 generates the client-domain dynamic dependency graph via tracing. Generating the client-domain dynamic dependency graph includes, in some aspects, executing the one or more client workflows within the client domain and tracing the second plurality of method calls during execution of the one or more client workflows in the client domain. Based on tracing the method calls resulting for the code's execution in the client domain, at least one upstream dependency relationship and/or a downstream dependency relationship for methods present in the second plurality of method calls can be identified, in an aspect. Accordingly, the third plurality of dependencies in the client-domain dynamic dependency graph includes the at least one of the upstream dependency relationship or the downstream dependency relationship for the methods present in the second plurality of method calls, in various aspects.

At block 210, an impact analysis is performed for the one or more client workflows based on a comparison of the first plurality of dependencies, the second plurality of dependencies, and the third plurality of dependencies. In some aspects, the impact analysis module 108 of the system 100 of FIG. 1 generates the impact analysis by performing a comparison of all identified dependencies, and/or by comparing the third plurality of dependencies to the dependency differences (e.g., dependencies that are not shared) identified by the graph superimposition discussed above. Accordingly, the third plurality of dependencies (e.g., client-domain dynamic graph) can be compared to the superimposition of the static dependency graph and the internal-domain dynamic dependency graph in order to identify any method dependencies that are absent or missing from one or both of the static dependency graph and the internal-domain dynamic dependency graph, for example.

In various aspects, the impact analysis identifies specific upstream and/or downstream method call dependencies within the one or more client workflows using each of the first, second, and third dependencies identified from respective graphs, wherein the impact analysis identifies overlap (one or more similarities) between the first, second, and third, dependencies, and wherein the impact analysis identifies one or more differences between the first, second, and third plurality dependencies for the one or more client workflows. In this manner, at least one method and/or method dependent that is present in the superimposed dependency graphs may be identified as being missing or absent from the client-domain dynamic dependency graph, and/or at least one method that is absent or missing in the client-domain dynamic dependency graph is present from the superimposed dependency graphs. Additionally, based on the comparison, a second set of dependencies that are common to and/or that are present in all of the graphs can be identified. These similarities and differences are included in the detailed impact analysis report that can be provided and/or displayed to a user, for example.

In this manner, a comprehensive view of all of the dependency relationships between all of the methods that were identified in all of the one or more client workflows (e.g., upstream, downstream, sequencing) is created by the aspects herein because each of the static, internal-domain dynamic, and client-domain dynamic dependency graphs are generated using a different technique and/or different domain which captures one or more dependencies that might otherwise have been unknown, missed, omitted, and/or not called depending on the technique or domain employed. The impact analysis results and/or report may be presented through a graphical user interface, as further discussed herein, using the graphical user interface module 110 of the system 100 of FIG. 1, for example.

FIG. 3 is a flow diagram showing a method 300 for impact identification based on code analysis, in accordance with aspects herein. At block 302, a static dependency graph is generated that maps a first plurality of dependencies for one or more client workflows encoded in a code base. In some aspects, generating the static dependency graph includes receiving a plurality of code bases as input and generating a plurality of separate dependency maps for the plurality of code bases. In one such aspect, each code base has a separate static dependency map generated such that each code base's dependencies are segregated in different files. The plurality of separate static dependency maps may subsequently be combined or aggregated into a single map that includes all of the dependencies identified for all of the client workflows encoded in the code bases, in some aspects. Further, in one such aspect, the combined map may be parsed. After parsing the combined map, the static dependency graph may be generated, in one aspect, to include and map a first plurality of dependencies. The first plurality of dependencies may include all of the dependencies identified in the plurality of code bases based on static scanning and parsing of the code bases. In some aspects, the static dependency graph module 102 of FIG. 1 may generate the static dependency graph by mapping a first plurality of dependencies for one or more client workflows encoded in a code base.

Figure 4:
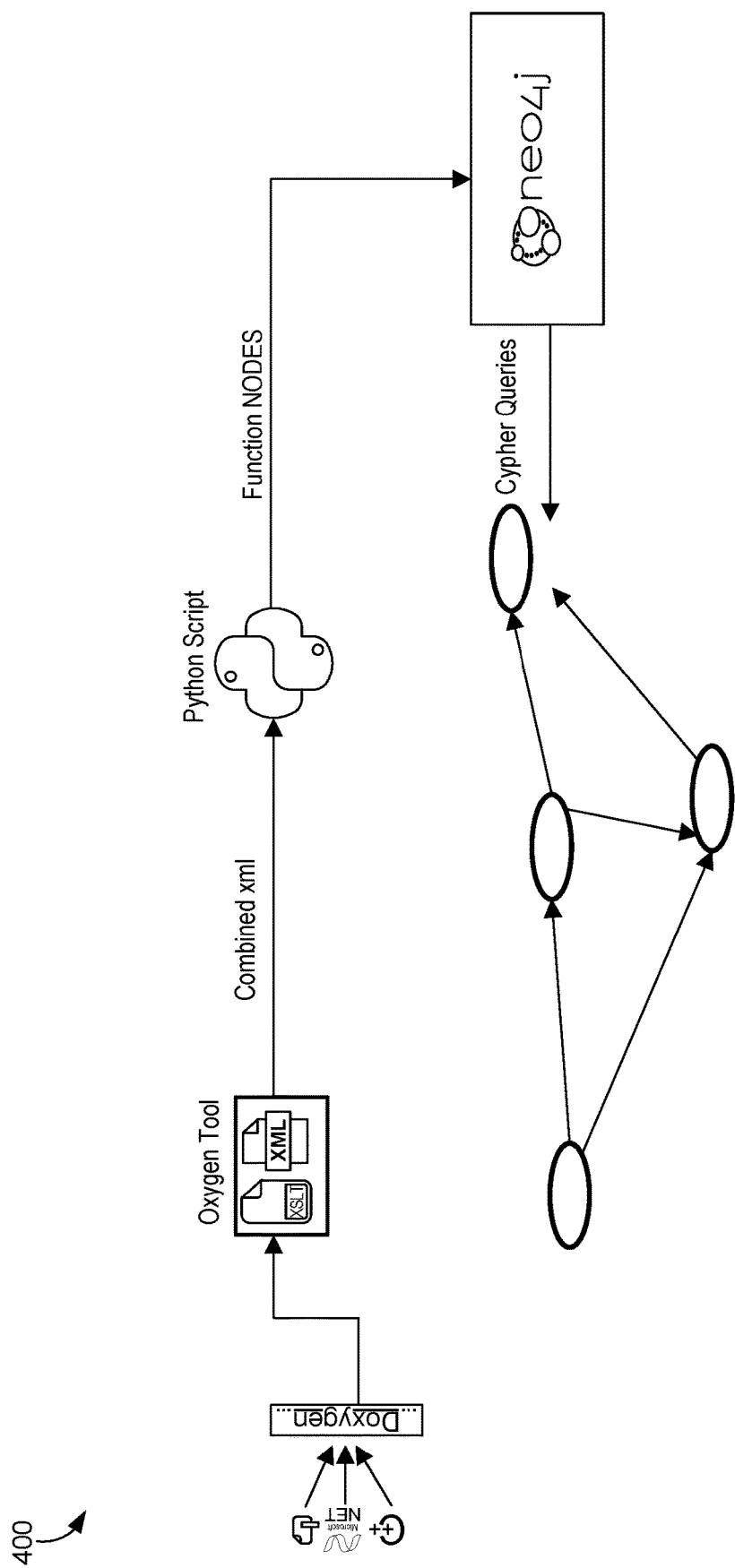
FIG. 4 is a simplified graphic diagram depicting static dependency graph generation, in accordance with aspects herein.

For example, FIG. 4 provides a simplified graphic diagram 400 depicting dependency graph generation, in accordance with aspects herein. In accordance with FIG. 4, multiple code bases are received as input. Then, a plurality of separate dependency maps are generated for the plurality of code bases, in one example, by an automated code base documentation generator tool (e.g., shown as Doxygen). The plurality of dependency maps can be combined into one aggregated map by an automated multi-platform editor tool (e.g., shown as Oxygen), in the example of FIG. 4. Further, an executable script (e.g., written in Python) may be used to parse the aggregated map to reveal one or more functional calls and to identify dependencies, in the example. Based on parsing the combined/aggregated map, dependencies can be identified and input to a graph database management system (e.g., neo4j), in the example of FIG. 4. Further, queries written in a declarative graph query language (e.g., Cypher queries) may be utilized so that the graph database management system automatically builds and generates the static dependency graph an output. Accordingly, this is just one example for generating a static dependency graph through a static scanning of a code base encoding one or more workflows.

At block 304, an internal-domain dynamic dependency graph is generated by tracing a first plurality of method calls based on execution of the code base in an internal domain, wherein the internal-domain dynamic dependency graph includes a second plurality of dependencies identified for the one or more client workflows based on the first plurality of method calls. For example, by executing the one or more client workflows within the internal domain, a portion or all of the first plurality of method calls can be traced. As such, the internal-domain dynamic dependency graph can indicate which method calls "called" other particular methods, which specific methods were called by other methods, and the sequencing of calls/calling between methods. In such aspects, a sequenced method call tree that represents a portion of all of the first plurality of method calls traced during the execution of the one or more client workflows in the internal domain can be generated. Using the sequenced method call tree, at least one of an upstream dependency relationship and/or a downstream dependency relationship for a portion or all of the methods resulting from the first plurality of method calls can be identified and included in the internal-domain dynamic dependency graph, in aspects. For example, the internal-domain dynamic dependency graph can include the second plurality of dependencies, wherein the second plurality of dependencies include the at least one of the upstream dependency relationship and/or the downstream dependency relationship for the portion or all of the methods traced using the first plurality of method calls resulting from the execution of the one or more client workflows in the internal domain. In various aspects, the dynamic dependency graph module 104 of FIG. 1 may generate the internal-domain dynamic dependency graph by tracing the first plurality of method calls based on execution of the code base in an internal domain, and/or further functions discussed above.

Figure 5:
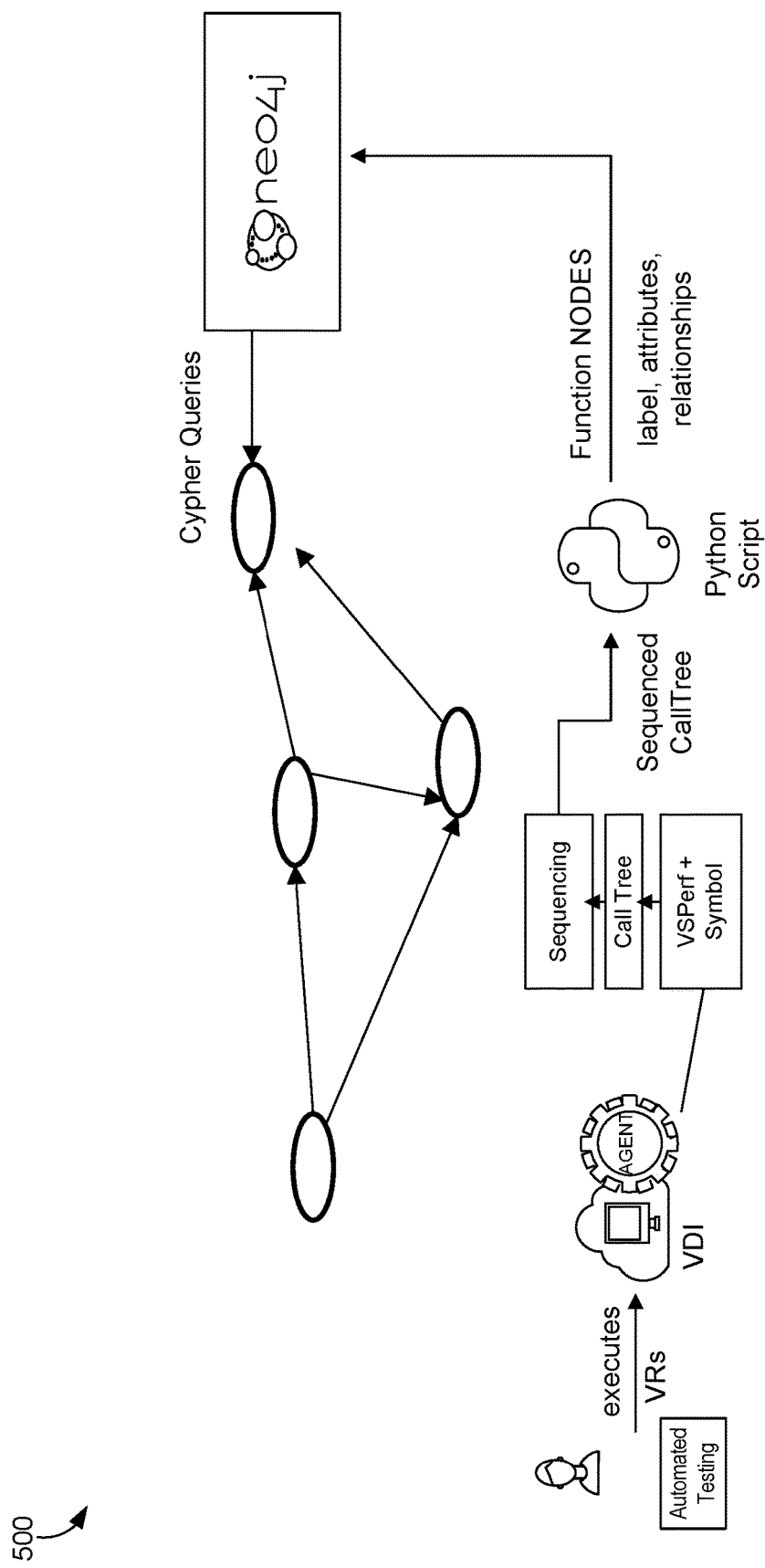
FIG. 5 is a simplified graphic diagram depicting dynamic dependency graph generation, in accordance with aspects herein.

For example, FIG. 5 depicts a simplified graphic diagram 500 depicting dynamic dependency graph generation, in accordance with aspects herein. In the example of FIG. 5. In accordance with FIG. 5, one or more code bases are executed using a processor so that one or more client workflows encoded in one or more code bases are performed or run within, for example, an automated runtime environment that mimics performance and utilization of the client workflow(s). For example, one or more client workflows encoded by the code base are run within an internal domain by executing the code. Based on running the client workflows, a portion of or all of a first plurality of functional calls/method calls performed during execution of the client workflows in the internal domain are traced, for example, as shown in FIG. 5, by using a Virtual Desktop Infrastructure (VDI) and a script (e.g., shown as "AGENT"). Based on tracing the functional calls/method calls that were performed in the client workflows in the internal domain, a sequenced method call tree that represents a portion or all of the first plurality of method calls traced is generated, as shown in the example of FIG. 5. Based on the sequenced method call tree, at least one of an upstream dependency relationship and/or a downstream dependency relationship for a portion or all of the methods present in the first plurality of method calls can be identified using automated scripts (e.g., shown as Python language scripts) that feed a graph database management system (e.g., neo4j). Further, queries written in a declarative graph query language (e.g., Cypher queries) may be utilized so that the graph database management system automatically builds and generates the internal-domain dynamic dependency graph an output. Accordingly, this is just one example for generating a dynamic dependency graph through the execution, within an internal domain, of a workflow encoded in a code base.

Continuing, at block 306, overlap and at least one difference between the first plurality of dependencies and the second plurality of dependencies are identified by superimposing the internal-domain dynamic dependency graph and the static dependency graph. As previously described herein, identifying one or more similarities and/or differences between the first plurality of dependencies and the second plurality of dependencies can include, using the superimposition of the graphs, identification of a first plurality of methods that are present in the internal-domain dynamic dependency graph but which are absent from the static dependency graph, for example. Additionally, identifying one or more similarities and/or differences between the first plurality of dependencies and the second plurality of dependencies can include, using the superimposition of the graphs, identifying a second plurality of methods that are absent in the internal-domain dynamic dependency graph but which are present in the static dependency graph, for example.

Figure 6:
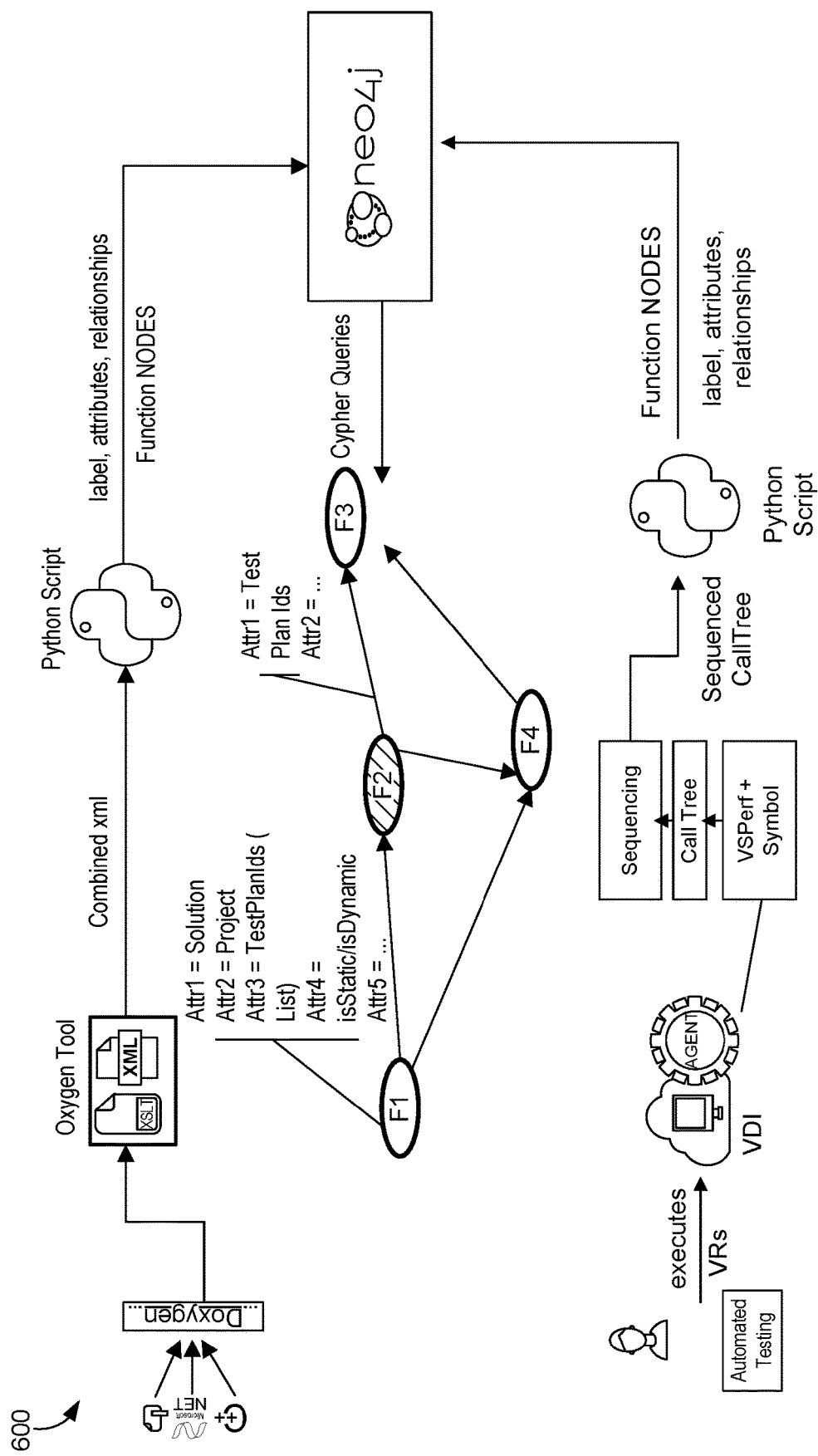
FIG. 6 is a simplified graphic diagram depicting superimposition of the static dependency graph of FIG. 4 and the dynamic dependency graph of FIG. 5, in accordance with aspects herein.

A portion of the first and second plurality of dependencies may be common or shared between both graphs, in some aspects. For example, FIG. 6 is a simplified graphic diagram 600 depicting superimposition of the static dependency graph of FIG. 4 and the internal-domain dynamic dependency graph of FIG. 5. As shown by the superimposition of FIG. 6, the method F2 can be identified as being present in the internal-domain dependency graph but is omitted, missing, and/or absent (i.e., is not present) from the static dependency graph, where the method F2 is called by the method F1 (e.g., upstream dependency), and where the method F2 calls the method F3 (e.g., downstream dependency). This process of determining which methods and dependencies are shared or omitted is performed for all of the first and second dependencies included in the superimposition. In some aspects, the superimposing module 106 of FIG. 1 superimposes the internal-domain dynamic dependency graph and the static dependency graph, and identifies the similarities and differences between the first plurality of dependencies and the second plurality of dependencies.

At block 308, a client-domain dynamic dependency graph is generated by tracing a second plurality of method calls based on execution of the code base in a client domain, wherein the client-domain dynamic dependency graph includes a third plurality of dependencies identified for the one or more client workflows based on the second plurality of method calls. The dynamic dependency graph module 104 of FIG. 1 may create the client-domain dynamic dependent module, in some aspects.

At block 310, an impact analysis is performed for the one or more client workflows based on a comparison of the first plurality of dependencies, the second plurality of dependencies, and the third plurality of dependencies. The impact analysis identifies specific upstream and downstream method call dependencies for the one or more client workflows using each of the first, second, and third dependencies, in aspects. As such, the impact analysis identifies overlap between the first, second, and third, dependencies, and the impact analysis identifies differences between the first, second, and third dependencies for the one or more client workflows, in some aspects. In various aspects, the impact analysis module 108 of FIG. 1 may perform the impact analysis, generate an impact analysis report, and may provide the impact analysis to another component to cause display of the impact analysis and results. In some aspects, the impact analysis module 108 compares the third plurality of dependencies to one or more of the dependencies that were identified as not being shared by both the static and internal-domain dynamic graphs, as superimposed. The impact analysis may results in a report that individually identifies, for any particular or selected method, all of the upstream and downstream dependencies of that particular methods as aggregated from the first, second, and third dependencies identified. In this manner, a comprehensive view of all of the dependency relationships for every individual method (e.g., upstream, downstream, sequencing) in the workflows is generated because each of the static, internal-domain dynamic, and client-domain dynamic dependency graphs are generated using a different technique and/or different domain which captures one or more dependencies that might otherwise have been unknown, missed, omitted, and/or not called depending on the technique or domain employed.

Figure 7:
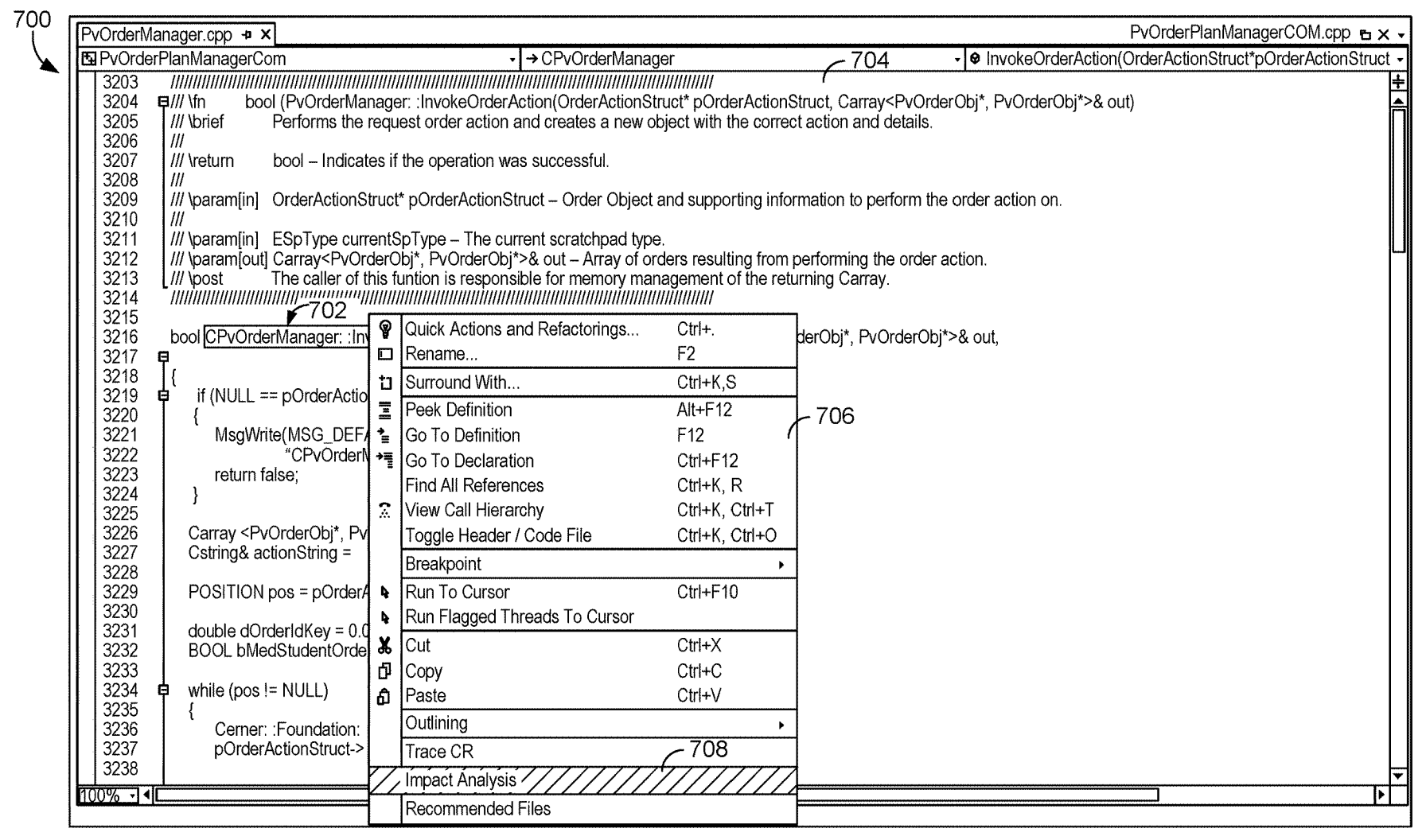

In further aspects, the method 300 may include generating and causing display of a user-interactive graphical user interface (GUI) that displays computer code for the one or more client workflows encoded in the code base. For example, as shown in FIG. 7, a graphical user interface 700 displays computer code for the one or more client workflows encoded in the code base. In one aspect, a selection of a first method directly from the computer code displayed in the user-interactive graphical user interface is received, for example, based on an indication of a user selection. In response, an impact analysis report may be automatically performed, or a pop-up menu with a selectable option to perform an impact analysis on the selected method may be displayed in the graphical user interface. As shown in the graphical user interface 700 of FIG. 7, when a portion 702 of the computer code that encodes the method "CPvOrderManager" is selected in the computer code 704 displayed, a pop-up menu 706 is displayed in response. The pop-up menu 706 includes an impact analysis menu option 708 that can be selected to trigger the display of the impact analysis report for the selected method. In another example, shown in the graphical user interface 900 of FIG. 9, another portion 902 of computer code 904 displayed in the graphical user interface 900 can be selected, the pop-up menu 706 can be displayed with the impact analysis menu option 708, and selection trigger the display of the impact analysis report for the selected method. In some aspects, the graphical user interface module 110 of FIG. 1 may generate and cause presentation of one or more of the user-interactive graphical user interfaces described herein, including pop-up menus, menu options, computer code, selectable nodes, and the like for both impact analysis and impact prediction aspects.

In further aspects, and in response to the selection of the method in the code and/or a selectable option in a menu for a selected method, an impact analysis report that is specific to the selected method is displayed in a graphical user interface. In such an aspect, the impact analysis report that is specific to the selected first method specifies at least one of an upstream dependency relationship or a downstream dependency relationship of a second method relative to the selected first method, which are known based on the impact analysis, as previously discussed.

Figure 8:
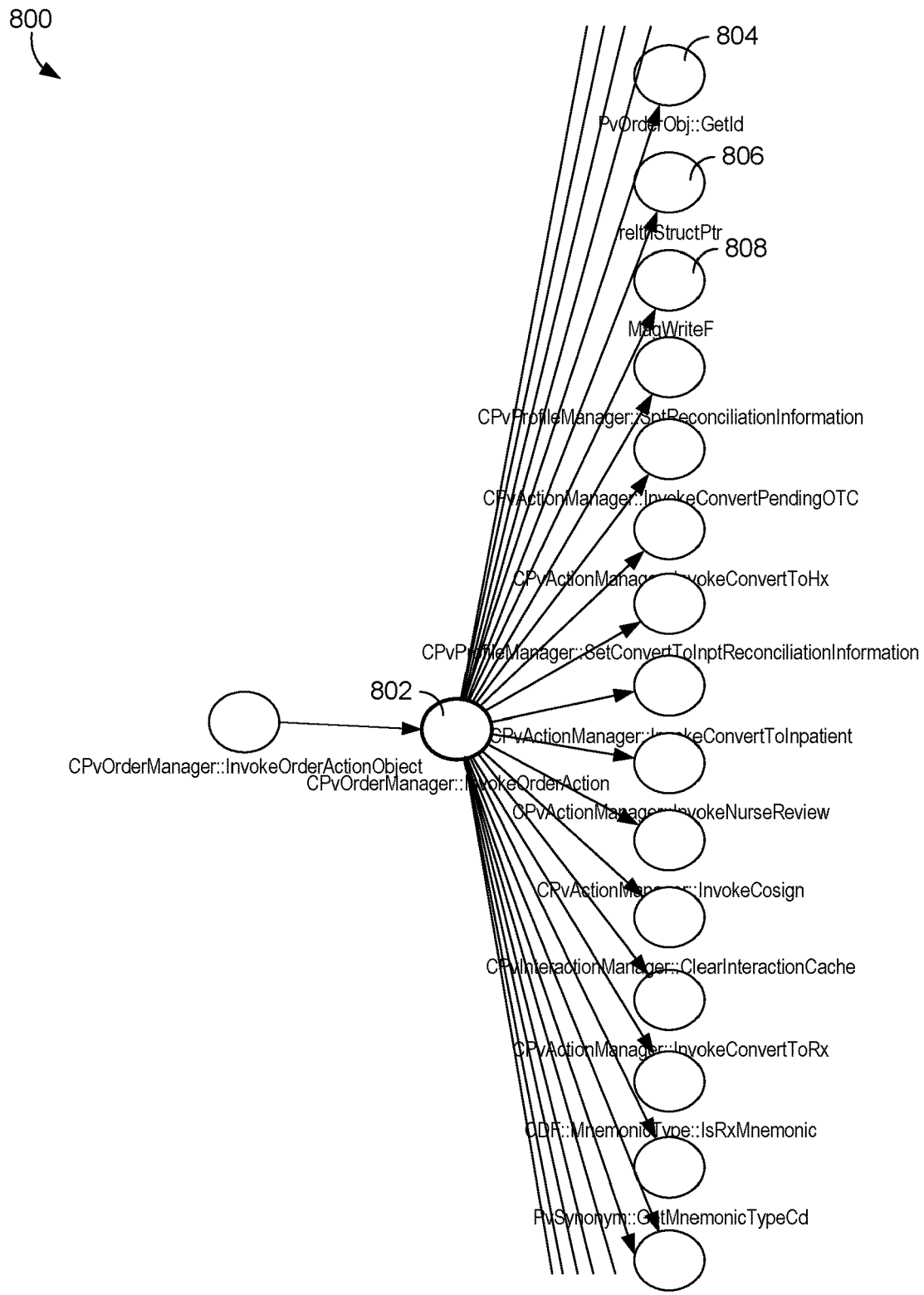
FIG. 8 depicts a graphical user interface presenting an impact analysis with selectable nodes representing methods and relative dependences, in accordance with aspects herein.

For example, in response to the selection of the impact analysis menu option 708 from FIG. 7, the graphical user interface 800 of FIG. 8 is generated and caused to be displayed. FIG. 8 depicts the outcomes of the impact analysis (e.g., report) as a graphic representation having a plurality of selectable nodes. Each of the selectable nodes represents a different method and the selectable nodes are arranged to represent the dependencies that are identified for the method that was selected, for example. In FIG. 8, a first selectable node 802 is presented to represent the method "CPvOrderManager" that was selected in FIG. 7. A plurality of selectable nodes 804, 806, and 808 are also display in FIG. 8 to represent various upstream and downstream method dependencies relative to the method "CPvOrderManager," based on the selection from FIG. 7. The first selectable node 802, the plurality of selectable nodes 804, 806, and 808, and their arrangement in the graphical user interface 800 relative to one another, represents the dependencies identified from static, internal-domain dynamic, and client-domain dynamic dependency graphs, the graph superimposition, and the comparisons from the impact analysis, as discussed hereinabove, which reveal a comprehensive view of all dependencies identified within the one or more client workflows.

Figure 9:
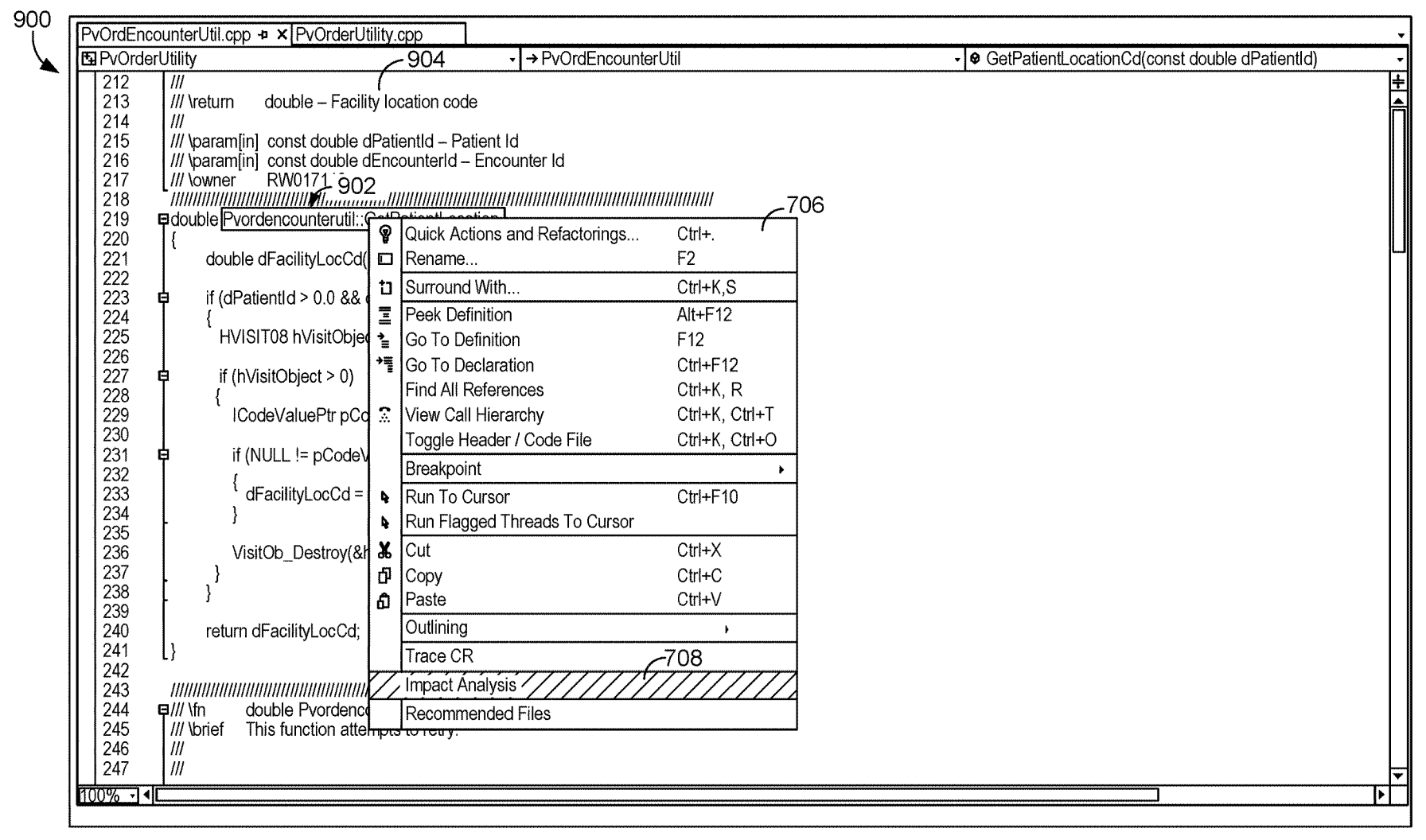
Figure 10:
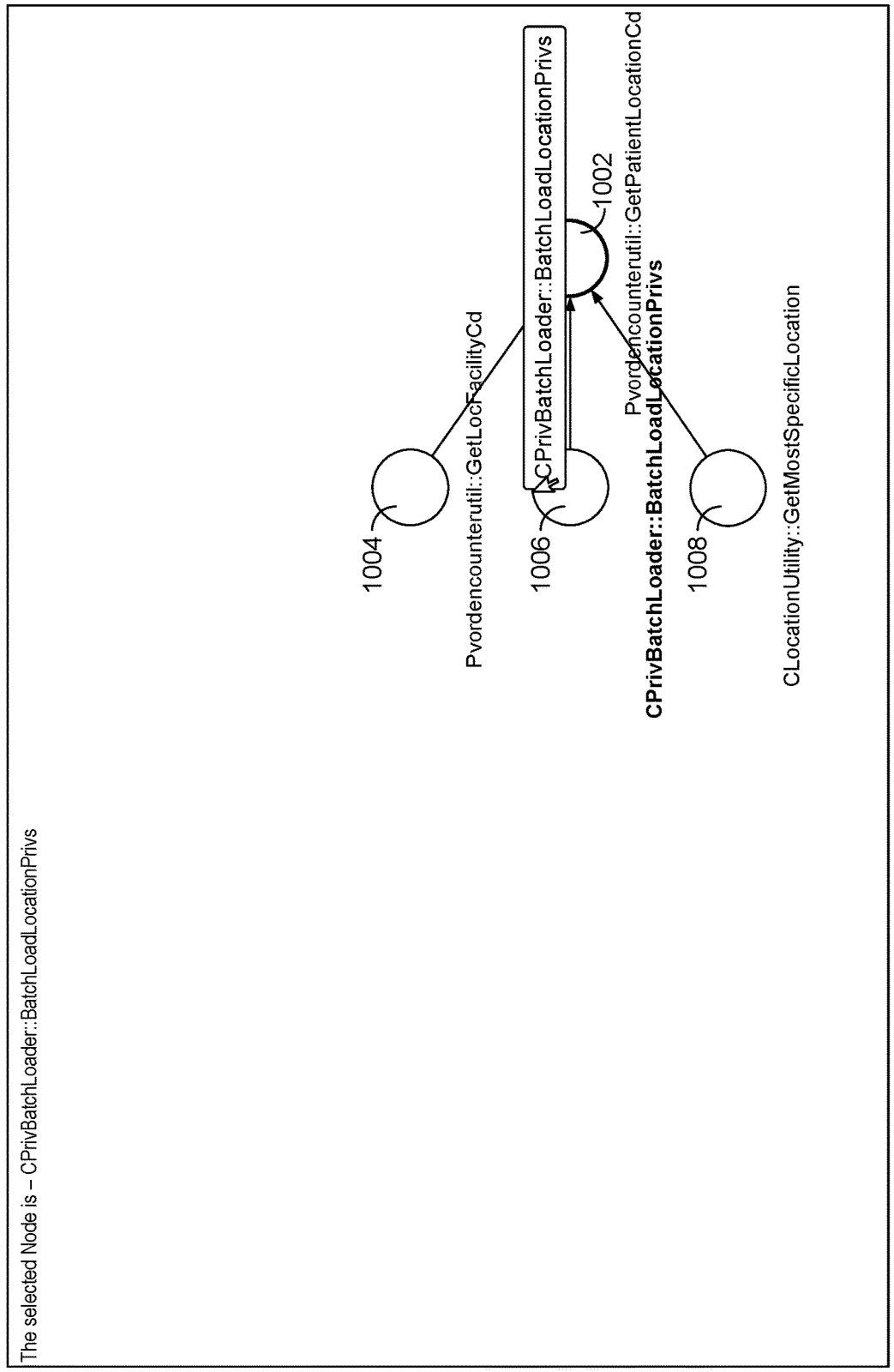
FIG. 10 depicts a graphical user interface of another impact analysis with selectable nodes representing methods and relative dependences, in accordance with aspects herein.
Figure 11:
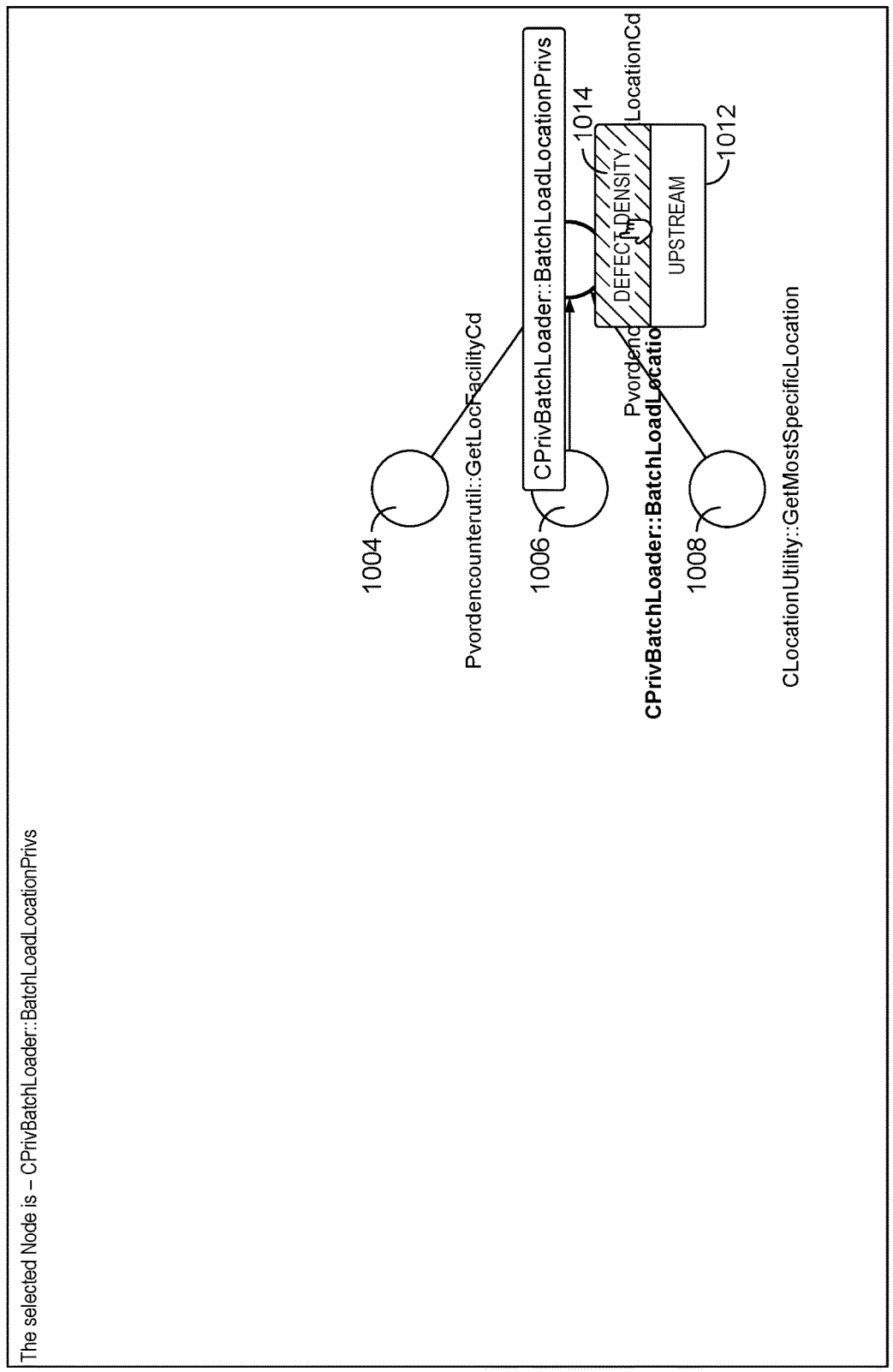
FIG. 11 depicts the graphical user interface of FIG. 10 with a pop-up menu option for performing a density analysis, in accordance with aspects herein.

In another example, shown in the graphical user interface 900 of FIG. 9, the impact analysis menu option 708 of the pop-up menu 706 in FIG. 9 can be selected to cause display of an impact analysis report, such as a graphical representation of identified methods and their relative dependencies, as identified based on the impact analysis methods discussed herein. In response to such a selection from FIG. 9, a first selectable node 1002 is presented in FIG. 10 that represents the particular method selected from the code as well as one or more other selectable nodes 1004, 1006, and 1008 that represent one or more upstream and/or downstream method dependencies of the selected particular method. Further, for example, when the first selectable node 1002 is selected in FIG. 10, the pop-up menu 706 with a density analysis menu option 1014 for performing a density analysis may be displayed for selection, as shown in the graphical user interface 1100 of FIG. 11. In response to a selection of the density analysis menu option 1014 for the selected node/method, a density analysis can be performed and/or density analysis results can be automatically displays in a graphical user interface 1200, as shown in FIG. 12. In FIG. 12, the defect density report for the selected node/method provides an overview of specific method dependencies for the selected node/method (e.g., the quantity of upstream methods that can be used to call the selected node/method, and the quantity of downstream methods that can be called by the selected node/method, relative to other methods in the workflow).

In further aspects of the graphical user interface(s) discussed above, one or more subsequent selections of a selectable node representing a second method that is upstream or downstream from the first method may be received. In response to the subsequent selection of a selectable node representing the second method, an updated display of the impact analysis report is automatically presented. The updated display of the impact analysis report may be specific to the first method and the second method, such that the updated impact analysis report identifies at least one of another upstream dependency relationship and/or another downstream dependency relationship of a third method relative to the second method, shown as one or more additional selectable nodes that are added to the impact analysis displayed in the graphical user interface. Each of the selectable nodes may include a displayed or displayable identifier that corresponds to a method and/or code for a method.

Figure 13:
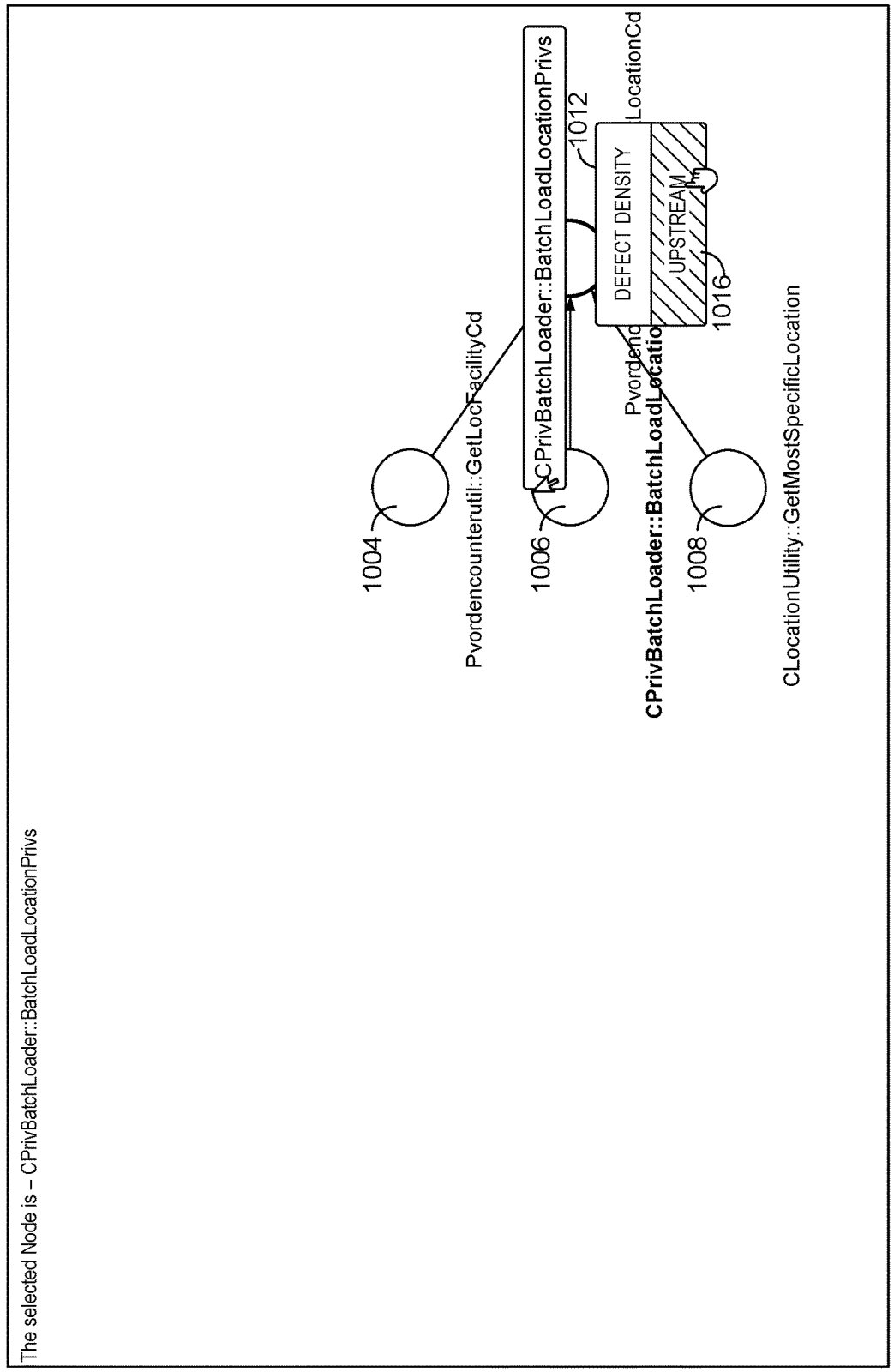
FIG. 13 depicts the graphical user interface of FIG. 10 with a pop-up menu option for performing an upstream impact analysis, in accordance with aspects herein.

For example, FIG. 13 depicts a graphical user interface 1300 having the first selectable node 1002 representing the method selected with another pop-up menu 1012, the pop-up menu 1012 having an upstream impact analysis menu option 1016 for performing and/or reporting on an upstream impact analysis on the first selectable node 1002/corresponding method. In response to the selection of the upstream impact analysis menu option 1016, the graphical user interface 1000 is updated to include the results of the upstream impact analysis for the first selectable node 1002. As shown in the graphical user interface 1400 of FIG. 14, an updated impact analysis report is displayed with additional upstream nodes (e.g., node 1018) that represent additional upstream methods in the client workflow, for example.

Figure 14:
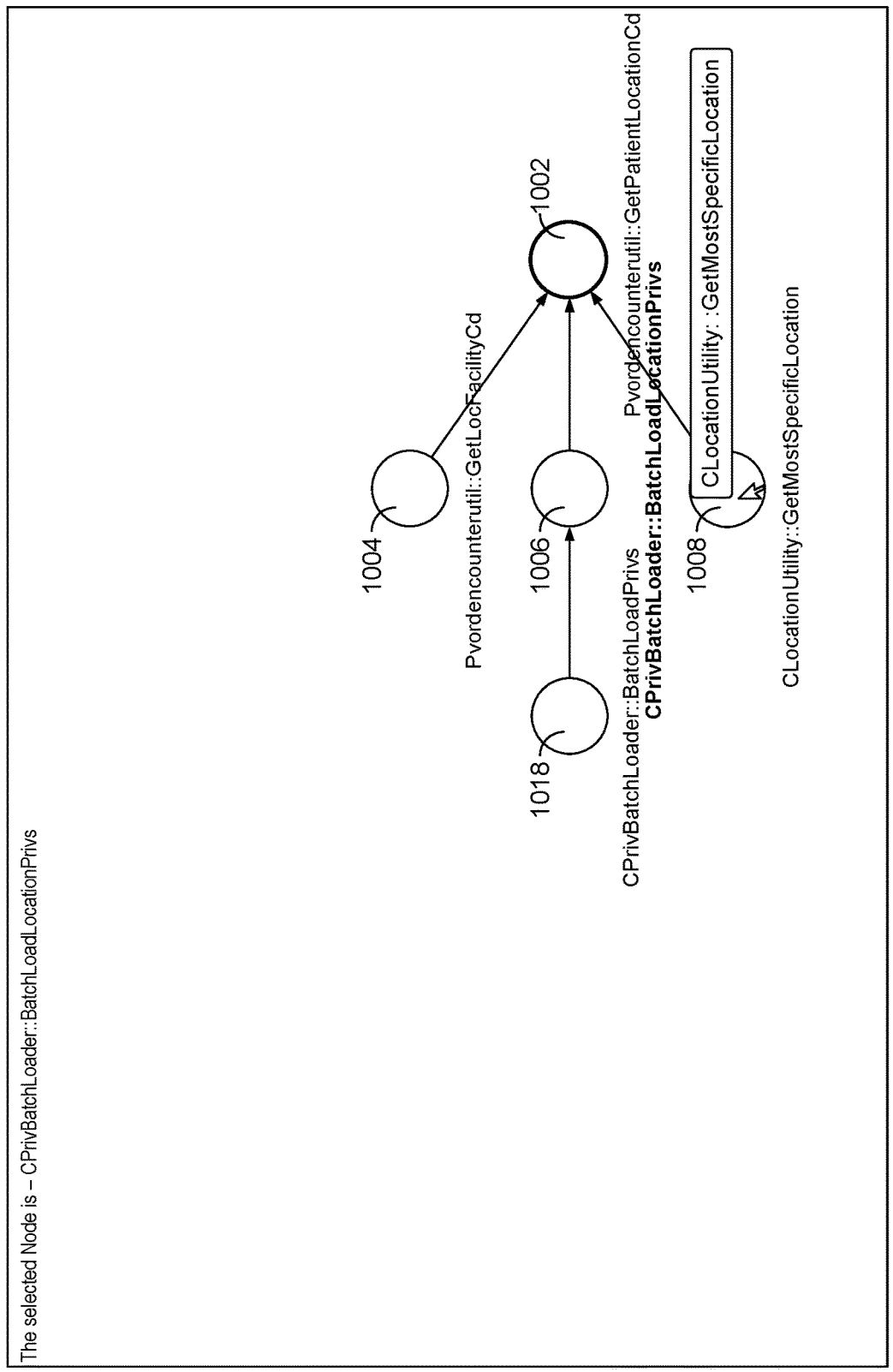
FIG. 14 depicts an upstream impact analysis with selectable nodes representing methods and relative dependences, in accordance with aspects herein.
Figure 15:
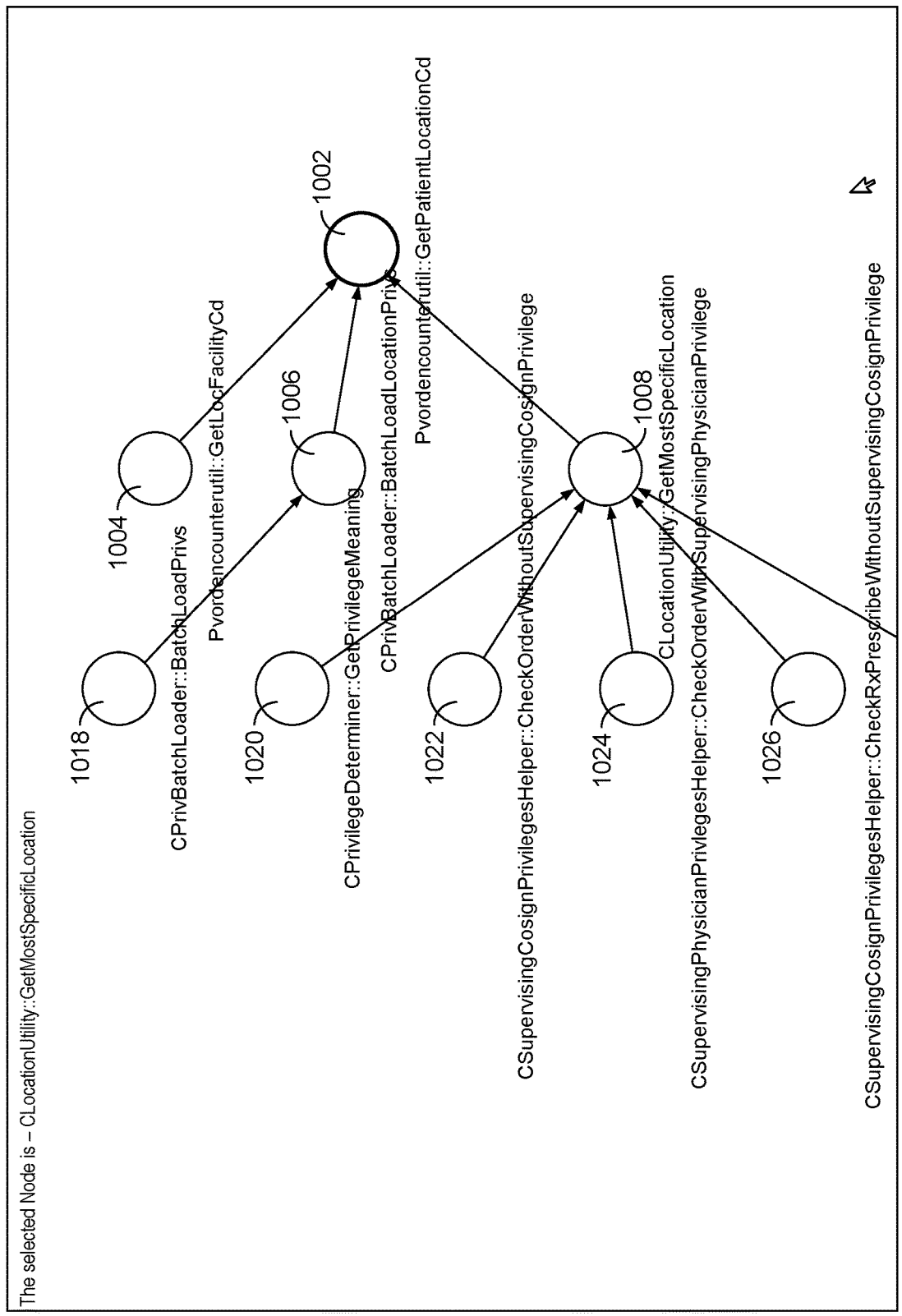
FIG. 15 depicts the upstream impact analysis of FIG. 14 that is updated with additional selectable nodes representing source code and relative dependences based on a node selection, in accordance with aspects herein.

Additionally, in response to the selection of a second selectable node 1008 (e.g., corresponding to a method "CLocationUtility::GetMostSpecificLocation") from the updated impact analysis report of FIG. 14 where the second selectable node 1008 is located upstream from the first selectable node 1002 (i.e., meaning that, in the client workflow of the code base, the method represented by the second selectable node 1008 calls the method represented the first selectable node 1002), the impact analysis report with selectable nodes representing dependences is updated again. For example, the graphical user interface 1500 if FIG. 15 displays an updated impact analysis report, which has been expanded to include several additional nodes (e.g., nodes 1020, 1022, 1024, 1026) representing upstream dependencies for the method represented by the second selectable node 1008 that was selected. Accordingly, the graphical user interfaces described herein are user interactive to allow expansion and contraction of method dependencies displayed, both upstream and downstream, as identified for the client workflows through impact analysis. This enables a user to view the comprehensive knowledge of all of the upstream and downstream dependencies identified between various methods in a client workflow, and each selected method, to view and identify other specific methods that will be affected when the selected method is modified in the code of the code base, for example. As such, the graphical user interfaces of the impact analysis can reveal and present exactly which methods will be affected by modifications to a method selected from the code shown in FIG. 9, for a client workflow and based on the identified dependencies.

Impact Prediction

Figure 16:
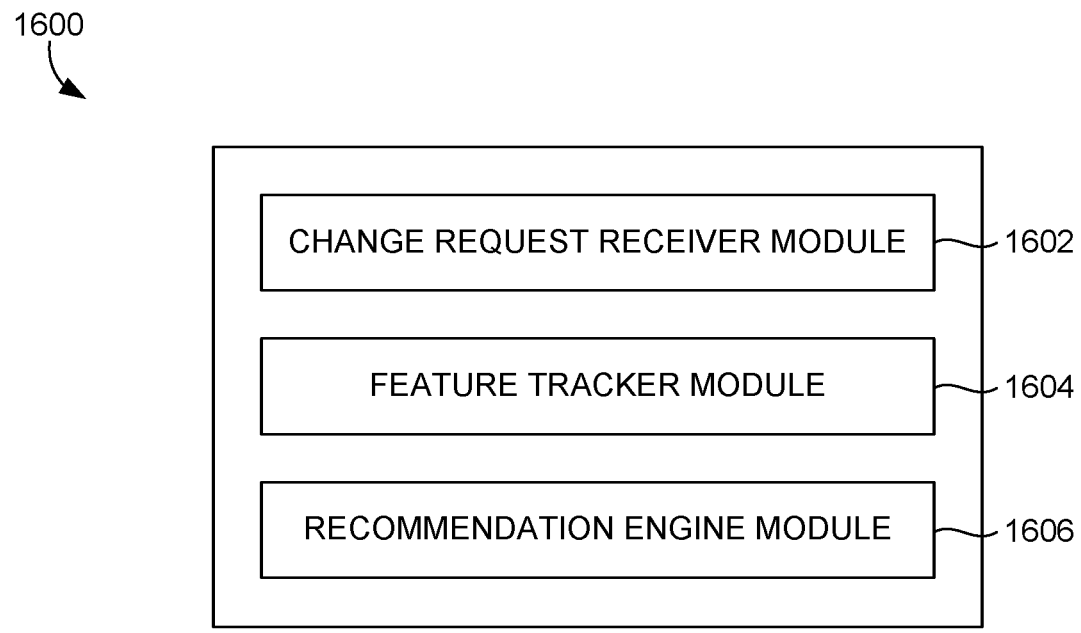
FIG. 16 is a block diagram of a system for impact prediction based on historical code modifications, in accordance with aspects herein.

FIG. 16 is a block diagram of a system 1600 for impact prediction based on historical code modification, in accordance with aspects herein. In various aspects, the system 1600 includes a modification request receiving module 1602, a feature tracking module 1604, and a recommendation engine module 1606. The system 1600 may further include one or more of the components in the system 100 of FIG. 1, for example, such as the graphical user interface module 110. In some aspects, the system 100 of FIG. 1 is utilized in tandem with, or is integrated with, the system 1600 of FIG. 16.

In the system 1600, the modification request receiving module 1602 is configured to receive a current request to modify a first method, in aspects. The modification request receiving module 1602 may receive multiple requests to modify any number of methods over time, such that one or more prior requests may be have been received to modify a plurality of various methods, in aspects. The feature tracking module 1604 is configured to track a modification made to the first method by the current request. Further, for one or more prior requests, the feature tracking module 1604 may have tracked each of many prior modifications made to any number of methods for prior requests. As such, the modification request receiving module 1602 may receive requests in a sequence and the feature tracking module 1604 may track the specific modifications and the methods modified within each request received in sequence over a period of time.

The system 1600 further includes, in various aspects, a recommendation engine module 1606. The recommendation engine module 1606 identifies at least a second method that was modified by at least one of the one or more prior requests that include a prior modification made to the first method, in aspects. In some aspects, the recommendation engine module 1606 determines a score of the second method, and based on the score, identifies that the second method is predicted to be affected by the modification made to the first method by the current request. The recommendation engine module 1606 may provide the recommendation that identifies at least the second method and that indicates the second method is predicted to be affected by the modification made to the first method by the current request. Finally, the system may include a graphical user interface module (not shown in FIG. 16) that causes the recommendation to be displayed in a graphical user interface.

Having described the system 1600 and components thereof, it will be understood by those of ordinary skill in the art that system 1600 is but one example of a suitable system and is not intended to limit the scope of use or functionality of the present invention. Similarly, system 1600 should not be interpreted as imputing any dependency and/or any requirements with regard to each component and combination(s) of components illustrated in FIG. 16. It will be appreciated by those of ordinary skill in the art that the arrangement and/or integrated placement of components illustrated in FIG. 16 are examples, and other methods, hardware, software, components, and devices for establishing direct, indirect, local, and/or remote communication links between the components may be utilized in implementations of the present invention. It will be understood to those of ordinary skill in the art that the components may be connected in various manners, hardwired or wireless, and may use intermediary components that have been omitted or not included in FIG. 16 for simplicity's sake. Further, it will be understood that the components of the system 1600 may communicate with each other directly or, for example, indirectly via a network, including one or more of a telecommunication network, a local area network (LANs), a wide area network (WANs), and/or a peer-to-peer-network, though not shown. Such networking environments may include campus-wide or enterprise-wide computer networks, intranets, and the Internet.

Further, the absence of components from FIG. 16 should not be interpreted as limiting the present invention to exclude additional components and combination(s) of components. Moreover, though components are represented in FIG. 16 as singular components, it will be appreciated that some aspects may include a plurality of devices and/or components such that FIG. 16 should not be considered as limiting the number of any device(s) or component(s) depicted. It should be understood that any number of components shown in FIG. 16 may be employed within the system 1600 within the scope of the present invention. Each may be implemented via a single device or multiple devices cooperating in a distributed environment.

Figure 17:
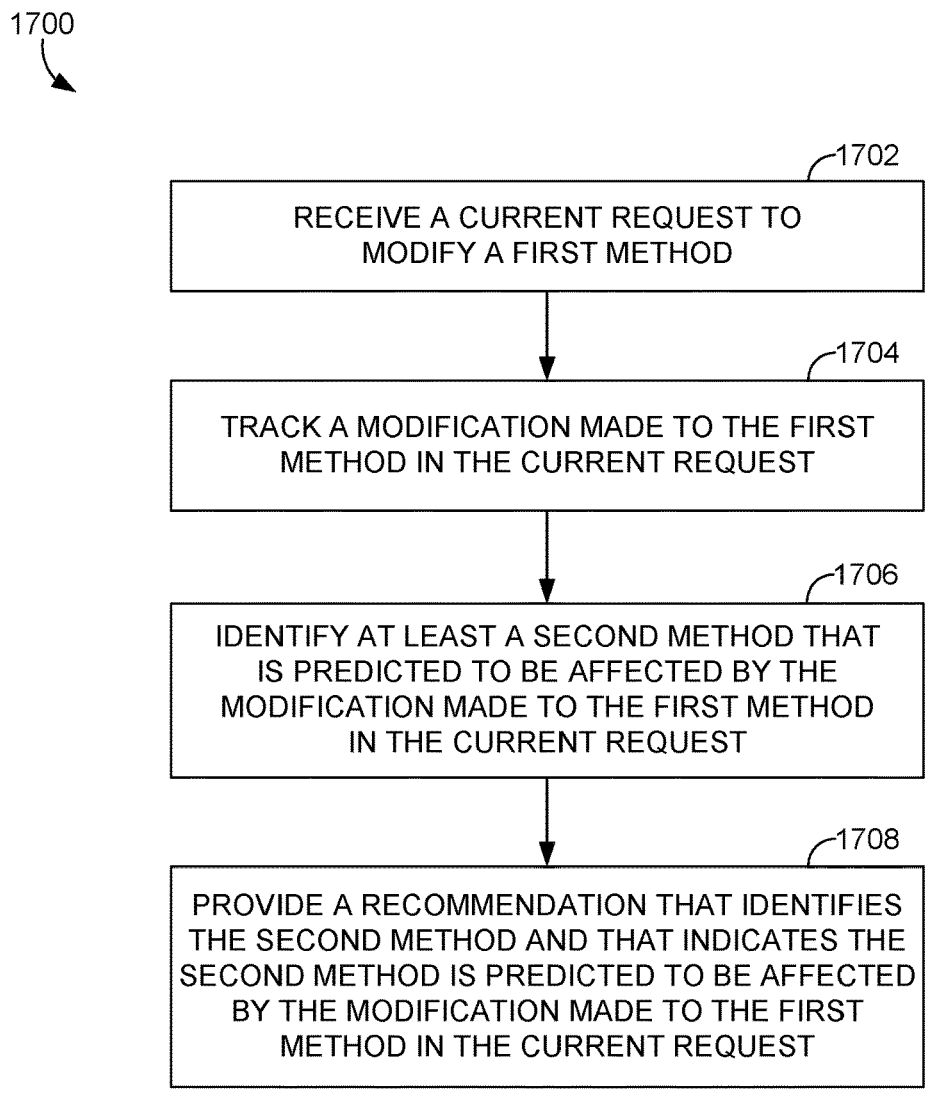
FIG. 17 depicts a flow diagram showing a method for impact prediction based on historical code modifications, in accordance with aspects herein.
Figure 18:
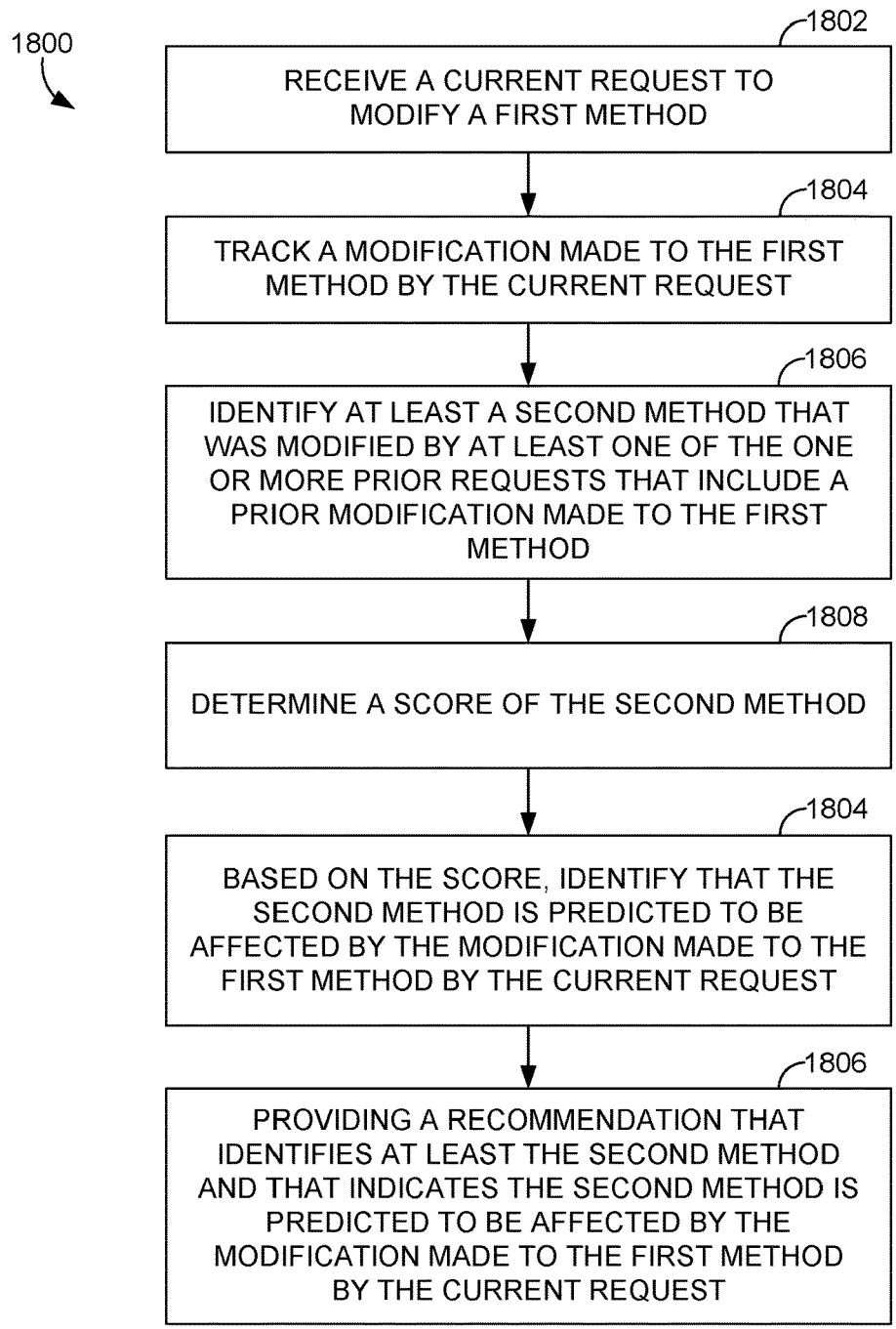
FIG. 18 is a flow diagram showing another method for impact prediction based on historical code modifications, in accordance with aspects herein.

Turning to FIGS. 17 and 18, methods are discussed that can be performed via one or more of the components and component interactions previously described in FIG. 16. As such, the methods are discussed briefly for brevity, though it will be understood that the previous discussion and details described therein can be applicable to aspect of the methods of FIGS. 17 and 18. Additionally or alternatively, it will be understood that the methods discussed herein can be implemented or performed via the execution of computer-readable instructions stored on computer readable media, by one or more processors. In some aspects, the methods can be computer-implemented methods. In one aspect, one or more non-transitory computer-readable storage media having computer-readable instructions or computer-readable program code portions embodied thereon, for execution via one or more processors, can be used to implement and/or perform the methods. For example, computer-readable instructions or computer-readable program code portions can specify the performance of the methods, can specify a sequence of steps of the methods, and/or can identify particular component(s) of a software and/or hardware for performing one or more of the steps of the methods, in aspects.

FIG. 17 depicts a flow diagram showing a method 1700 for impact prediction based on historical code modifications, in accordance with aspects herein. At block 1702, a current request to modify a first method in received. In some aspects, the modification request receiving module 1602 of FIG. 16 receives one or more prior requests to modify the first method and/or other methods, and subsequently receives the current request to modify the first method and/or other methods.

At block 1704, a modification being made to the first method in the current request is tracked. In some aspects, the feature tracking module 1604 of the system 1600 of FIG. 16 tracks the modification(s) made to the first method and/or made to other methods for each of the current request and any prior requests. The modifications and the methods modified may be record and documents by the feature tracking module 1604, in an aspect. Tracking the modification made to the first method in the current request can include, for example, identifying the current request (e.g., timestamp, version), identifying the first method (e.g., a specific method identifier or "name"), and identifying the particular modification that is being made to the first method in the current request. The first method may also be tagged as being modified in the current request, and the tag may include or identify the particular modification that is being made to the first method in the current request, in further aspects. In some aspects, the first method that is tagged is mapped to at least a second method and/or a plurality of other methods that were modified in one or more prior requests that also included a prior modification to the first method.

At block 1706, at least a second method is identified that is predicted to be affected by the modification being made to the first method in the current request. In one aspect, a plurality of methods are identified, where each of the plurality of methods are predicted to be affected by the modification being made to the first method in the current request. In some aspects, the recommendation engine module 1606 predicts and identifies that at least the second method has an increased likelihood of being affected by the modification being made to the first method in the current request, for example, relative to other methods and based on prior requests that made modifications to both the first method and the second method. The second method may be predicted to be affected by the modification made to the first method in the current request by determining a score for the second method based on mapping the current request to one or more prior requests, as further discussed hereinafter. In some aspects, a lower score indicates a predicted increased likelihood of being affected by the modification made to the first method in the current request, and a higher score indicates a predicted decreased likelihood of being affected by the modification made to the first method in the current request. In an alternative aspect, a higher score indicates a predicted increased likelihood of being affected by the modification made to the first method in the current request, and a lower score indicates a predicted decreased likelihood of being affected by the modification made to the first method in the current request.

At block 1708, a recommendation is provided that identifies the second method and that indicates the second method is predicted to be affected by the modification made to the first method in the current request. The recommendation engine module 1606 of FIG. 16, for example, can determine and provide the recommendation that the second method is predicted to be affected by the modification made to the first method in the current request, for example, based on the scoring and based on the prior requests that made modifications to both the first method and the second method. In further aspects, a graphical user interface is generated and displayed in order to present the recommendation.

Figure 19:
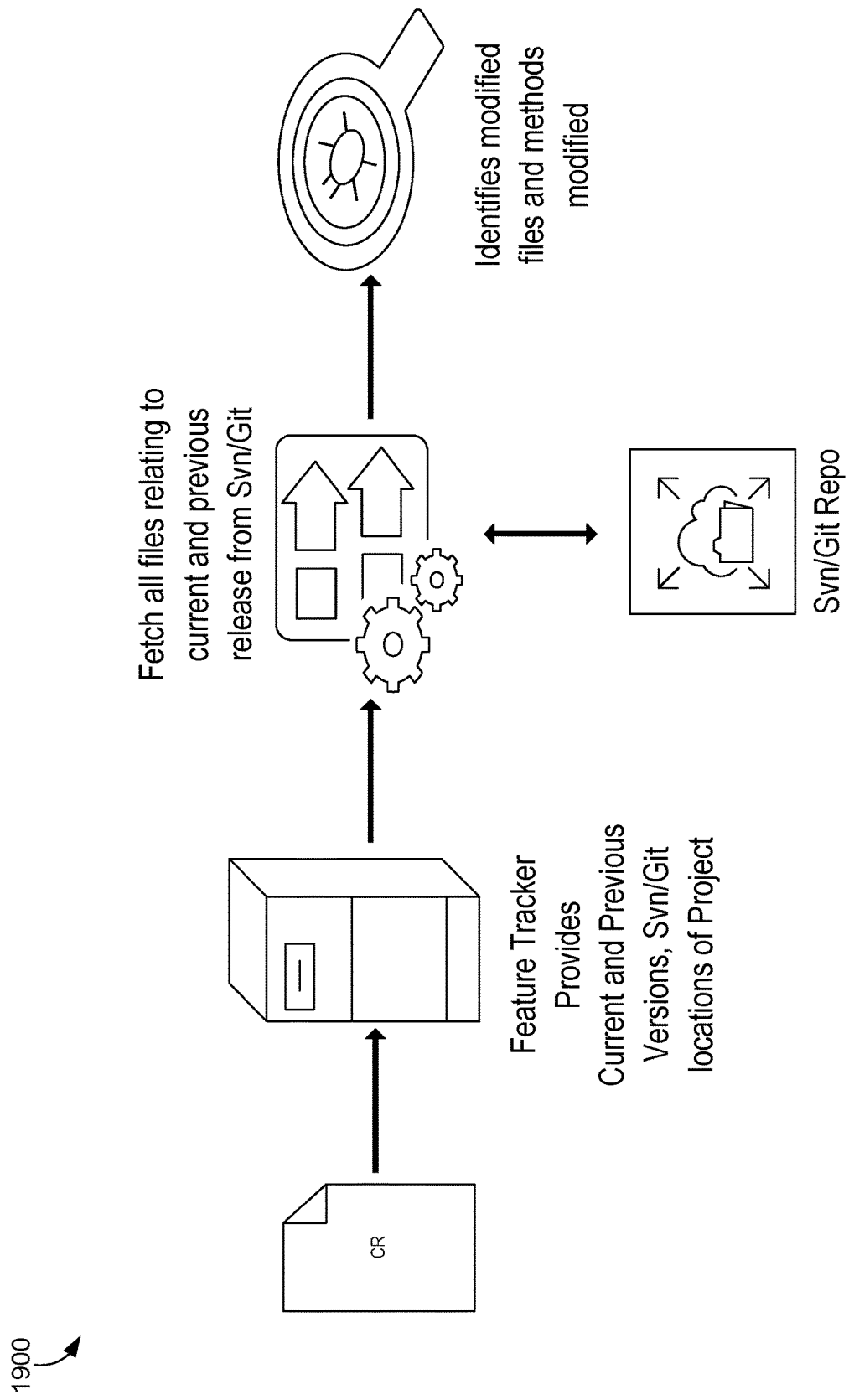
FIG. 19 is a simplified graphic diagram depicting binary value assignment in impact prediction, in accordance with aspects herein.

FIG. 18 is a flow diagram showing a method 1800 for impact prediction based on historical code modifications, in accordance with aspects herein. The method 1800 is discussed with brevity, as aspects herein have been discussed above with regards to FIGS. 16 and 17. At block 1802, a current request to modify a first method is received. At block 1804, the modification made to the first method by the current request is tracked. In some aspects, tracking a modification made to the first method in the current request includes identifying that the first method is being modified in the current request. In the current request, the first method identified as being modified may be tagged, in aspects. FIG. 19 is a simplified graphic diagram 1900 that depicts an example of feature tracking for impact prediction, in accordance with aspects herein. At block 1806, at least a second method is identified that was modified by at least one of the one or more prior requests that also include a prior modification made to the first method. For example, a plurality of prior requests that modified the same first method may be identified. The prior requests may also include prior modification to other methods, in the example. In such an example, the first method that has been tagged can be mapped at least one of a plurality of methods that were previously modified in prior requests, for example. The second method may be one of the plurality of methods, in such aspects.

In one example, the current request for the first method can be compared to the one or more prior requests by determining that one or more prior requests include prior modifications to the first method. All of a plurality of methods that were modified in the one or more prior requests that include prior modifications to the first method may also be identified for analysis, in one aspect. In one example, a plurality of scores for all of the plurality of methods may be determined using the tracking of the prior requests, as further described herein, and the score may be used to determine that at least the second method in the plurality of methods is predicted to be affected by the modification made to the first method by the current request. The second method may have a score that, relative to the score for the remaining plurality of methods, indicates the second method has an increased likelihood of being affected by modifications to the first method, in some aspects. For example, when a plurality of prior requests indicate that the second method was modified along with the first method in 60%, 75% or 90% of those prior requests, the second method may be a score representing that the second method is predicted to be affected by changes made to the first method, based on the reoccurring co-modification in the prior requests.

Accordingly, at block 1808, a score of the second method is determined. In some aspects, the score of the second method is determined by assigning, for each of the one or more prior requests, a binary value of one when the second method was modified by the prior request or a binary value of zero when the method was not modified by the prior request. A matrix of the binary values assigned to the second method for the one or more prior requests can be generated, in some aspects. Further, in such aspects, a total value of the second method may be calculated by summing the binary values of the matrix and normalized by multiplying the total value by a predetermined factor. The normalized total value acts as the score of the second method, in some aspects.

Figure 20:
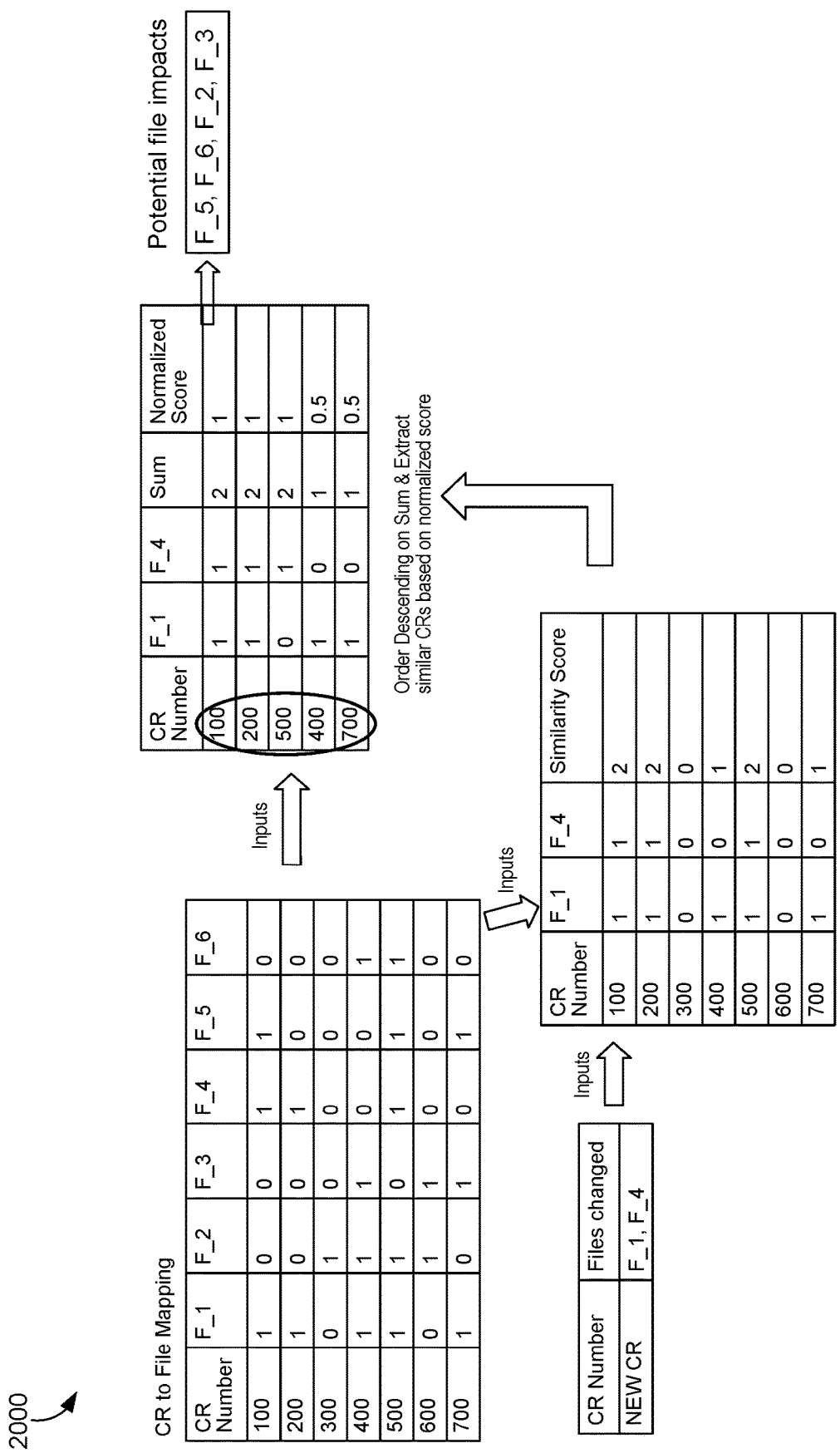
FIG. 20 depicts binary value assignments for method modifications in prior requests that are used for impact prediction, in accordance with aspects herein.

In further methods, for each of the plurality of methods in each of the one or more prior requests, a binary value of zero may be assigned to a method that was not modified by the prior request, whereas a binary value of one may be assigned when the method was modified by the prior request. In such a manner, a matrix may be generated for the plurality of methods that were modified or not modified in the one or more prior requests, in some aspects. A score may be calculated for each of the methods by summing the binary values respectively assigned to each of the plurality of methods for the one or more prior requests, and by multiplying the total value of a method by a normalization factor to reach the normalized total value, in one aspect. The normalized total value of each of the plurality of methods, including the second method, may then be compared to one another and ranked, for example. FIG. 20 depicts example of binary value assignment tables or matrices 2000 for method modifications in prior requests that are used for impact prediction, in accordance with aspects herein. For example, multiple requests (e.g., 100, 200, 300, 400, etc., where NEW CR is the current request) for multiple methods (e.g., F_1, F_2, F_3, etc.) have been tracked and assigned a binary value that indicates whether the particular method was modified in that particular request, as shown in the top left table of FIG. 20. Further, one or more prior requests that included a modification to the first method are identified by mapping the NEW CR to the one or more prior requests, as shown in the bottom middle table of FIG. 20. These other methods that were modified in each of the prior requests alongside the first method are identified and used to predict which of those other methods may be impacted or affected by the modification to the first method in the current request, in aspects.

At block 1810, based on the score of the second method, the second method is identified as being predicted to be affected by the modification of the first method by the current request. For example, the normalized total value of each of the plurality of methods, including the second method, may be compared to one another. In such an example, one or more of the methods, including the second method, may be selected as being predicted to be affected by the modification made to the first method by the current request because of the methods' respective scores. In some aspects, the second method is identified and selected for recommendation when, for example, a threshold is met by the score of the second method and/or the score of the second method is greater than the score of the other methods. In some aspects, multiple methods are selected for recommendation in order of greatest likelihood of being affect by the modification made to the first method by the current request. Based on the summing and normalization, a lower score indicates a predicted increased likelihood of being affected by the modification made to the first method in the current request, and wherein a higher score indicates a predicted decreased likelihood of being affected by the modification made to the first method in the current request.

Figure 21:
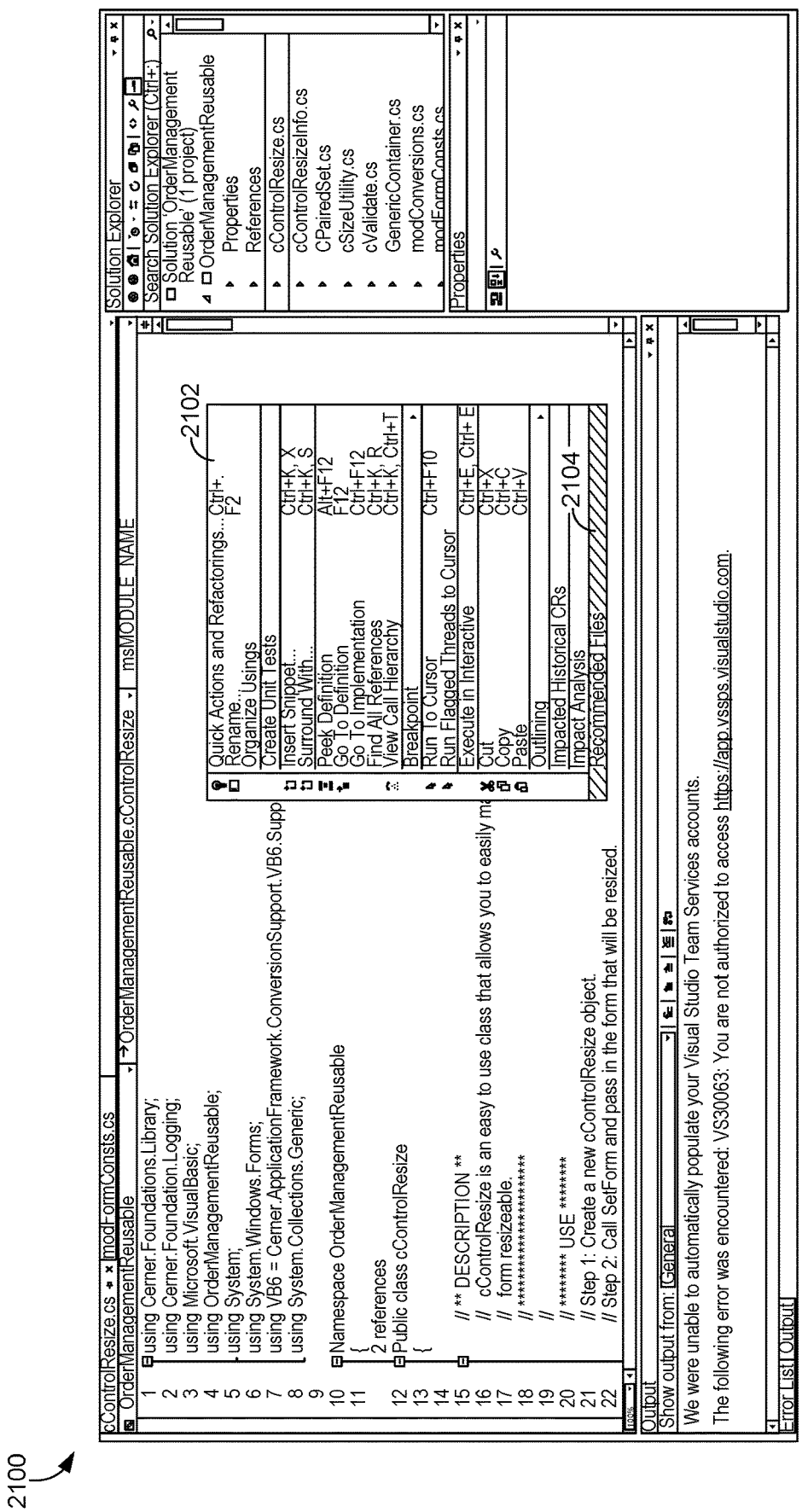
FIG. 21 depicts a graphical user interface with a pop-menu option for impact prediction, in accordance with aspects herein.
Figure 22:
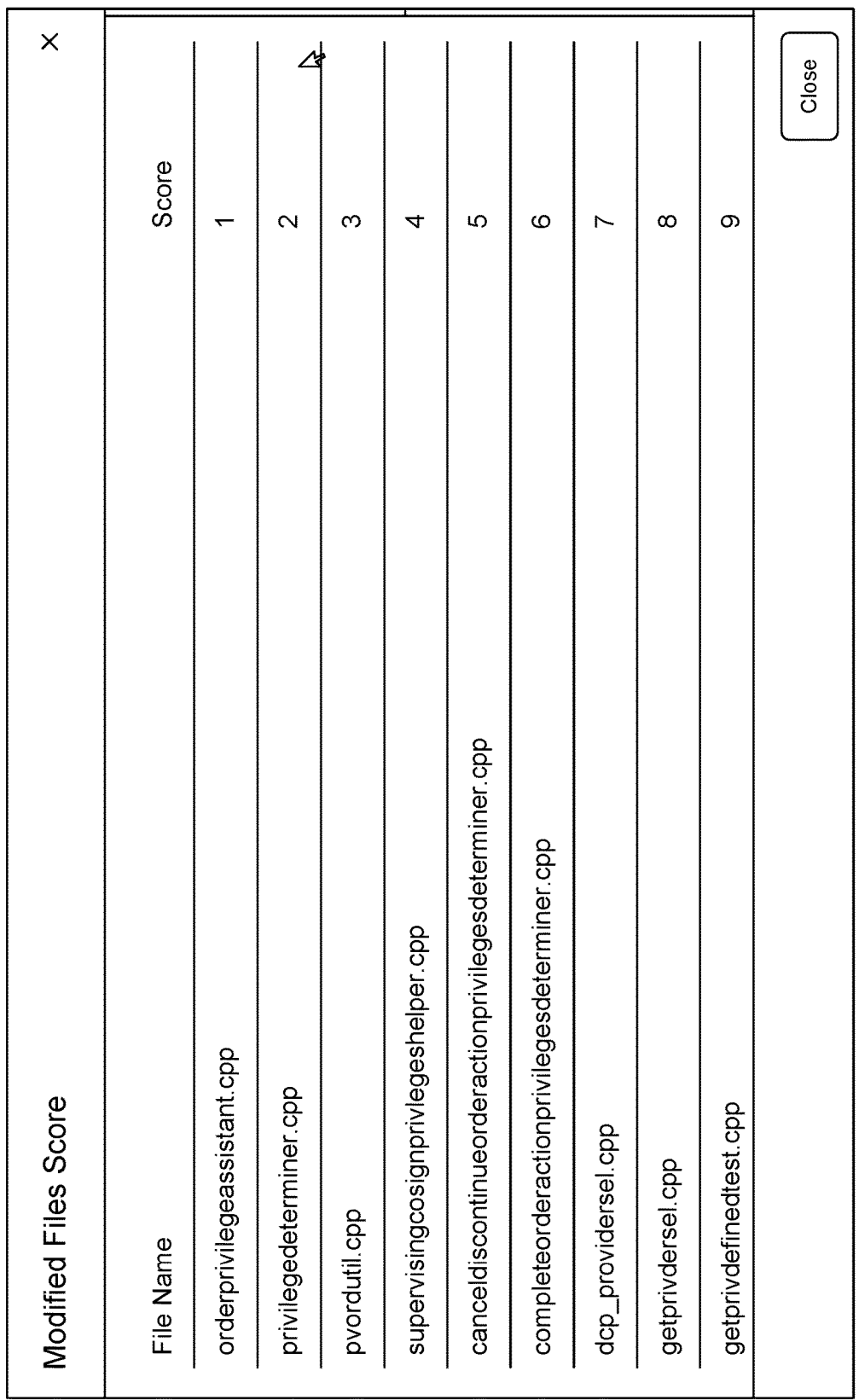
FIG. 22 depicts a graphical user interface that displays an impact prediction score report, in accordance with aspects herein.

At block 1812, a recommendation is provided that identifies at least the second method and that indicates the second method is predicted to be affected by the modification made to the first method by the current request. The recommendation may be provided in a graphical user interface, in some aspects. FIG. 21 depicts a graphical user interface 2100 with a pop-menu option 2102 for impact prediction, such that a user may input the current request to modify the first method. The pop-up menu 2106 may include a recommendation menu option 2104 for selection, which is used to trigger a recommendation for the current request. In response to selection of the recommendation menu option 2104, the graphical user interface 2200 of FIG. 22 is used to display the impact prediction score report for the first method in the current request, in accordance with aspects herein. As shown in FIG. 22, one or more specific methods are identified (e.g., "name") and the score for each of the specific methods are displayed, for example, in a score ascending order that represents the strength of the prediction, i.e., the likelihood that each of the recommended methods may be affected by the modification to the first method in the current request, based on historical modifications of the prior requests.

Figure 23:
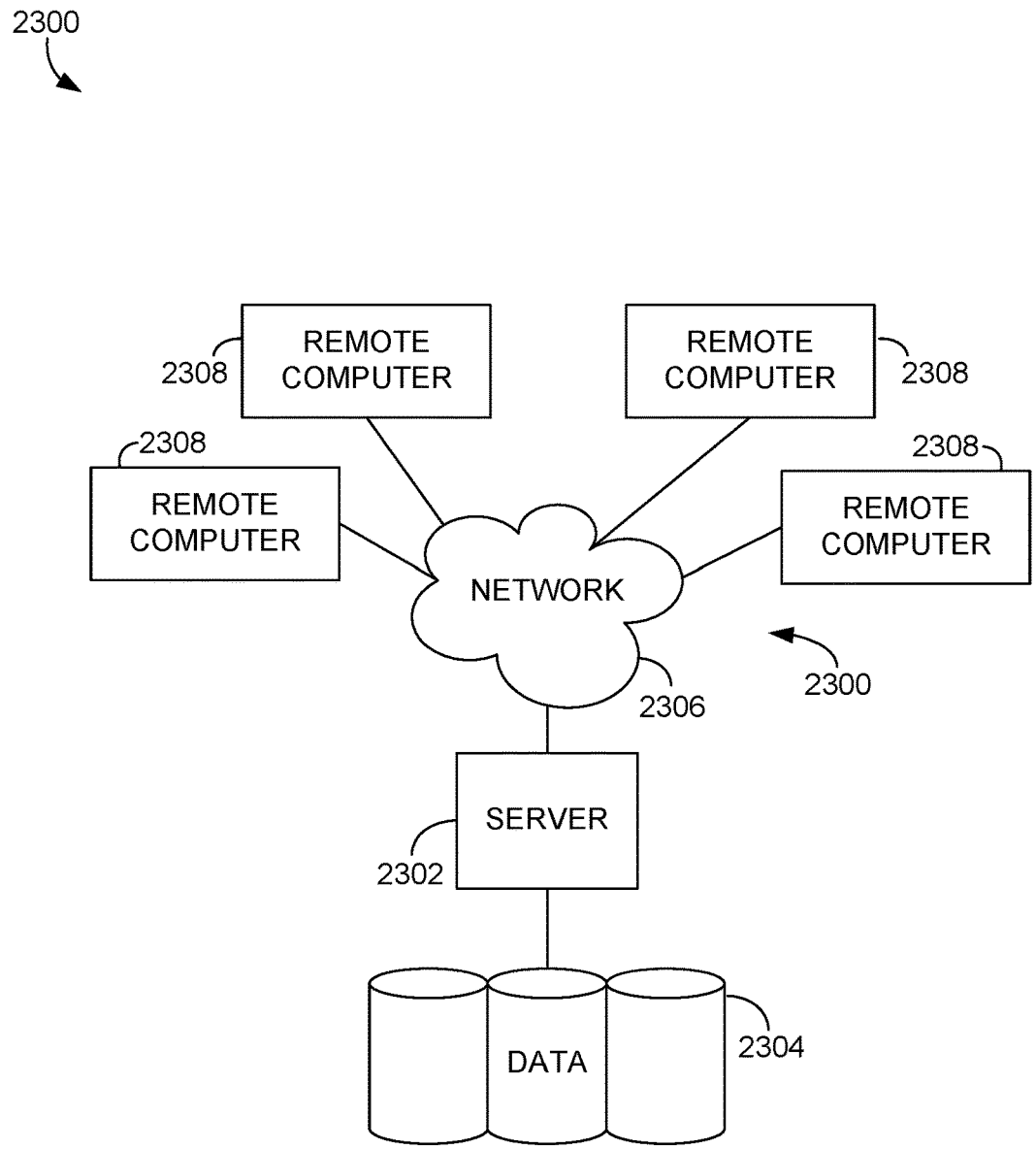
FIG. 23. is a diagram of a computing environment, in accordance with aspects herein

Turning now to FIG. 23, a diagram of a computing environment 2300 that is suitable to implement aspects described hereinabove is depicted. It will be understood by those of ordinary skill in the art that the computing environment 2300 is just one example of a suitable computing environment and is not intended to limit the scope of use or functionality of the present invention. Similarly, the computing environment 2300 should not be interpreted as imputing any dependency and/or any requirements with regard to each component and combination(s) of components illustrated in FIG. 23. It will be appreciated by those having ordinary skill in the art that the connections illustrated in FIG. 23 are also exemplary as other methods, hardware, software, and devices for establishing a communications link between the components, devices, systems, and entities, as shown in FIG. 23, may be utilized in implementation of the present invention. Although the connections are depicted using one or more solid lines, it will be understood by those having ordinary skill in the art that the exemplary connections of FIG. 23 may be hardwired or wireless, and may use intermediary components that have been omitted or not included in FIG. 23 for simplicity's sake. As such, the absence of components from FIG. 23 should be not be interpreted as limiting the present invention to exclude additional components and combination(s) of components. Moreover, though devices and components are represented in FIG. 23 as singular devices and components, it will be appreciated that some aspects may include a plurality of the devices and components such that FIG. 1 should not be considered as limiting the number of a device or component.

Continuing, the computing environment 2300 of FIG. 23 is illustrated as being a distributed environment where components and devices may be remote from one another and may perform separate tasks. The components and devices may communicate with one another and may be linked to each other using a network 2302. The network 2302 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 2302, generally, provides the components and devices access to the Internet and web-based applications.

The computing environment 2300 comprises a computing device 2304 in the form of a server. Although illustrated as one component in FIG. 23, the present invention may utilize a plurality of local servers and/or remote servers in the computing environment 2300. The computing device 2304 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 2304 may include or may have access to computer-readable media. Computer-readable media can be any available media that may be accessed by the computing device 2304, and includes volatile and non-volatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 2304. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the computing device 2304 uses logical connections to communicate with one or more remote computers 2306 within the computing environment 2300. In aspects where the network 2302 includes a wireless network, the computing device 2304 may employ a modem to establish communications with the Internet, the computing device 2304 may connect to the Internet using Wi-Fi or wireless access points, or the server may use a wireless network adapter to access the Internet. The computing device 2304 engages in two-way communication with any or all of the components and devices illustrated in FIG. 23, using the network 2302. Accordingly, the computing device 2304 may send data to and receive data from the remote computers 2306 over the network 2302.

Although illustrated as a single device, the remote computers 2306 may include multiple computing devices. In an aspect having a distributed network, the remote computers 2306 may be located at one or more different geographic locations. In an aspect where the remote computers 2306 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some aspects, the remote computers 2306 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the remote computers 2306 may be physically located in a non-medical setting, such as a packing and shipping facility or deployed within a fleet of delivery or courier vehicles.

Continuing, the computing environment 2300 includes a data store 2308. Although shown as a single component, the data store 2308 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 2308 includes physical memory that is configured to store information encoded in data. For example, the data store 2308 may provide storage for computer-readable instructions, computer-executable instructions, data structures, data arrays, computer programs, applications, and other data that supports the functions and action to be undertaken using the computing environment 2300 and components shown in exemplary FIG. 23.

In a computing environment having distributed components that are communicatively coupled via the network 2302, program modules may be located in local and/or remote computer storage media including, for example only, memory storage devices. Aspects of the present invention may be described in the context of computer-executable instructions, such as program modules, being executed by a computing device. Program modules may include, but are not limited to, routines, programs, objects, components, and data structures that perform particular tasks or implement particular abstract data types. In aspects, the computing device 2304 may access, retrieve, communicate, receive, and update information stored in the data store 2308, including program modules. Accordingly, the computing device 2304 may execute, using a processor, computer instructions stored in the data store 2308 in order to perform aspects described herein.

Although internal components of the devices in FIG. 23, such as the computing device 2304, are not illustrated, those of ordinary skill in the art will appreciate that internal components and their interconnection are present in the devices of FIG. 23. Accordingly, additional details concerning the internal construction device are not further disclosed herein.

The present invention has been described in relation to particular aspects, which are intended in all respects to be illustrative rather than restrictive. Further, the present invention is not limited to these aspects, but variations and modifications may be made without departing from the scope of the present invention.

What is claimed is:

1. One or more non-transitory computer-readable media having computer-executable instructions embodied thereon that when executed via one or more processors cause the one or more processors to facilitate a plurality of operations, the operations comprising:

tracking, via a tracking feature module, a modification made to a first method;

identifying one or more other methods that are predicted to be affected by the modification, wherein the identifying includes execution of at least a portion of code associated with the first method and performance of at least one trace based on the execution;

determining a score of each of the one or more other methods, wherein the score for a second method of the one or more methods is based at least on:

(a) a first value assigned to each historical occurrence in which the second method was affected by one or more prior modifications of the first method, the one or more prior modifications being made before the modification; and (b) a second value assigned to each historical occurrence in which the second method was not affected by the one or more prior modifications;

determining that at least one of the one or more other methods has a score that at least meets a threshold; and generating a presentation, on an electronic user interface, of a recommendation that identifies the at least one of the one or more other methods determined to have the score that at least meets the threshold.

2. The one or more non-transitory computer-readable media of claim 1, wherein the tracking comprises:

identifying a request that identifies the first method; and identifying, in the request, a particular modification being made to the first method.

3. The one or more non-transitory computer-readable media of claim 1, wherein the identifying is based on historical code modifications made to one or more workflows.

4. The one or more non-transitory computer-readable media of claim 1, wherein the identifying is based on one or more prior requests each including a prior modification being made to both the first method and at least one of the one or more other methods.

5. The one or more non-transitory computer-readable media of claim 1, wherein a score value of one represents that the first method was modified by a prior instance, and wherein a score value of zero represents that the first method was not modified by the prior instance.

6. The one or more non-transitory computer-readable media of claim 1, wherein the operations further comprise:
tagging the first method; and
mapping the first method to the one or more other methods.

7. The one or more non-transitory computer-readable media of claim 1, wherein a lower score indicates a predicted increased likelihood of being affected by the modification, and wherein a higher score indicates a predicted decreased likelihood of being affected by the modification.

8. The one or more non-transitory computer-readable media of claim 1, wherein the operations further comprise generating, via at least one processor associated with a recommendation engine module, a matrix indicating a least a portion of prior instances when the one or more other methods were modified.

9. The one or more non-transitory computer-readable media of claim 8, wherein the matrix contains score values.

10. The one or more non-transitory computer-readable media of claim 9, wherein the operations further comprise determining a value associated with the score by summing a plurality of binary values of the matrix.

11. The one or more non-transitory computer-readable media of claim 1, wherein the first value and the second value are different.

12. The one or more non-transitory computer-readable media of claim 1, wherein each of the first values indicates a same first numerical quantity and each of the second values indicates a same second numerical quantity.

13. The one or more non-transitory computer-readable media of claim 1, wherein the score for the second method is determined based on a sum of binary values respectively indicating whether the one or more prior modifications affected the second method.

14. A computer-implemented method, comprising:
via one or more processors:
tracking, via a tracking feature module, a modification made to a first method;
identifying one or more other methods that are predicted to be affected by the modification, wherein the identifying includes execution of at least a portion of code associated with the first method and performance of at least one trace based on the execution;
determining a score of each of the one or more other methods, wherein the score for a second method of the one or more other methods is based at least on:
(a) a first value assigned to each historical occurrence in which the second method was affected by one or more prior modifications of the first method, the one or more prior modifications being made before the modification; and
(b) a second value assigned to each historical occurrence in which the second method was not affected by the one or more prior modifications;
determining that at least one of the one or more other methods has a score that at least meets a threshold; and
generating a presentation, on an electronic user interface, of a recommendation that identifies the at least one of the one or more other methods determined to have the score that at least meets the threshold.

15. The computer-implemented method of claim 14, wherein the identifying is based on historical code modifications made to one or more workflows.

16. The computer-implemented method of claim 14, wherein the identifying is based on one or more prior requests each including a prior modification being made to both the first method and at least one of the one or more other methods.

17. The computer-implemented method of claim 14, wherein a score value of one represents that the first method was modified by a prior instance, and wherein a score value of zero represents that the first method was not modified by the prior instance.

18. The computer-implemented method of claim 14, wherein a lower score indicates a predicted increased likelihood of being affected by the modification, and wherein a higher score indicates a predicted decreased likelihood of being affected by the modification.

19. A system having one or more processors configured to facilitate a plurality of operations, the operations comprising:
tracking, via a tracking feature module, a modification made to a first method;
identifying one or more other methods that are predicted to be affected by the modification, wherein the identifying includes execution of at least a portion of code associated with the first method and performance of at least one trace based on the execution;
determining a score of each of the one or more other methods, wherein the score for a second method of the one or more other methods is based at least on:
(a) a first value assigned to each historical occurrence in which the second method was affected by one or more prior modifications of the first method, the one or more prior modifications being made before the modification; and
(b) a second value assigned to each historical occurrence in which the second method was not affected by the one or more prior modifications;
determining that at least one of the one or more other methods has a score that at least meets a threshold; and
generating a presentation, on an electronic user interface, of a recommendation that identifies the at least one of the one or more other methods determined to have the score that at least meets the threshold.

20. The system of claim 19, wherein the tracking comprises:
identifying a request that identifies the first method; and
identifying, in the request, a particular modification being made to the first method.

21. The system of claim 19, wherein the identifying is based on historical code modifications made to one or more workflows.

22. The system of claim 19, wherein the identifying is based on one or more prior requests each including a prior modification being made to both the first method and at least one of the one or more other methods.

23. The system of claim 19, wherein a score value of one represents that the first method was modified by a prior instance, and wherein a score value of zero represents that the first method was not modified by the prior instance.

24. The system of claim 19, wherein a lower score indicates a predicted increased likelihood of being affected by the modification, and wherein a higher score indicates a predicted decreased likelihood of being affected by the modification.

25. The system of claim 19, wherein the first value and the second value comprise a first binary value and a second binary value different from the first binary value, respectively.

* * * * *